(12) United States Patent
Ushiyama

(10) Patent No.: US 8,412,684 B2
(45) Date of Patent: Apr. 2, 2013

(54) INFORMATION CREATING APPARATUS, RECORDING MEDIUM, METHOD AND RETRIEVAL METHOD UTILIZING DATA STRUCTURE CONTAINING HINT AND LINK INFORMATION

(75) Inventor: Kentaro Ushiyama, Nagoya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 366 days.

(21) Appl. No.: 12/659,797

(22) Filed: Mar. 22, 2010

(65) Prior Publication Data
US 2011/0078124 A1 Mar. 31, 2011

(30) Foreign Application Priority Data
Sep. 28, 2009 (JP) ................. 2009-223503

(51) Int. Cl.
*G06F 7/00* (2006.01)
*G06F 17/00* (2006.01)

(52) U.S. Cl. ...................................... 707/690

(58) Field of Classification Search .............. 707/711
See application file for complete search history.

(56) References Cited

U.S. PATENT DOCUMENTS

| 4,774,657 | A | * | 9/1988 | Anderson et al. ............... 1/1 |
| 2007/0283043 | A1 | | 12/2007 | Kiyohara et al. |
| 2009/0037445 | A1 | | 2/2009 | Ushiyama |
| 2009/0292947 | A1 | * | 11/2009 | Ganesh et al. ............ 714/16 |

FOREIGN PATENT DOCUMENTS

| JP | A-2006-197400 | 7/2006 |
| JP | A-2007-280303 | 10/2007 |

* cited by examiner

*Primary Examiner* — Rehana Perveen
*Assistant Examiner* — Hung Havan
(74) *Attorney, Agent, or Firm* — Oliff & Berridge, PLC

(57) ABSTRACT

An information creating apparatus creates a leaf page information including one or more records with a key information to be compared with a retrieval key information inputted for retrieval of a record. The apparatus creates, based on the key information of the record included in the leaf page information, a judgment information used to judge a possibility that the leaf page information located in a position of child of the node page information located between the root and leaf page informations, and in lower positions than it, includes the record to be retrieved with the retrieval key information, and creates the node page information including the judgment information. The apparatus creates the root page information including the judgment information included in the node page information located in the positions of the child of the root page information, and stores the root, node and leaf page informations in a tree structure.

13 Claims, 15 Drawing Sheets

FIG. 5
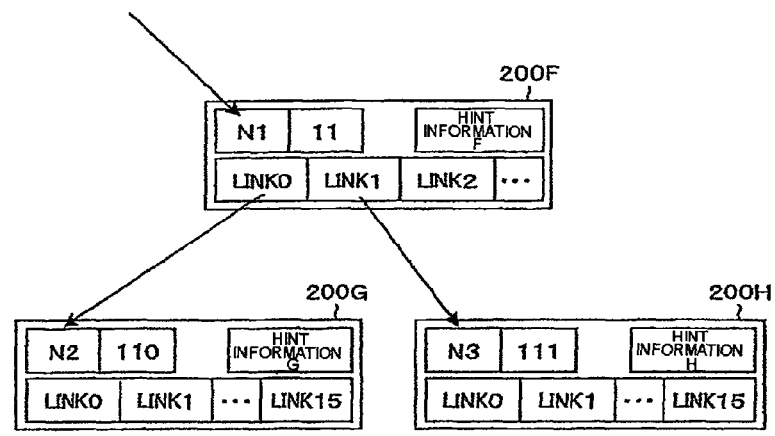
(a)
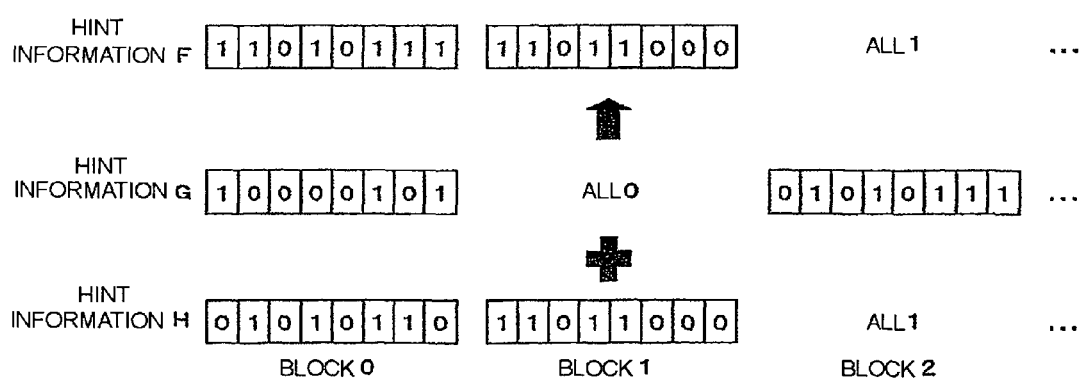
(b)

FIG. 6
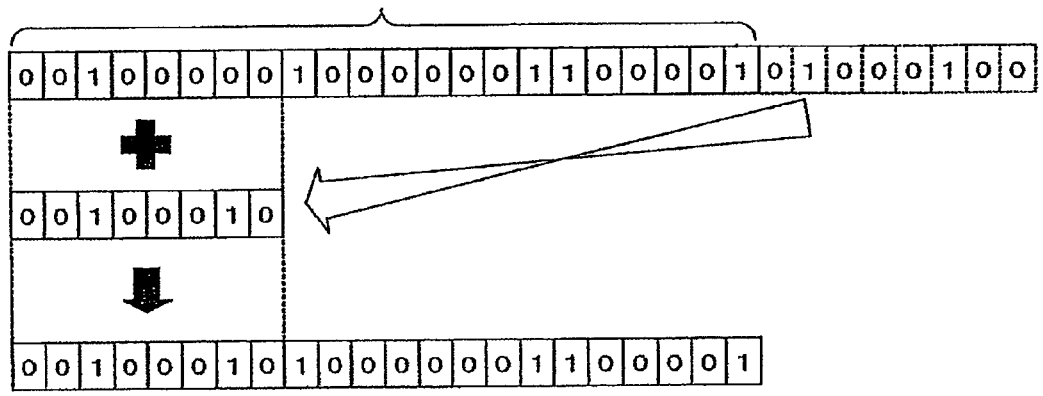
(a)
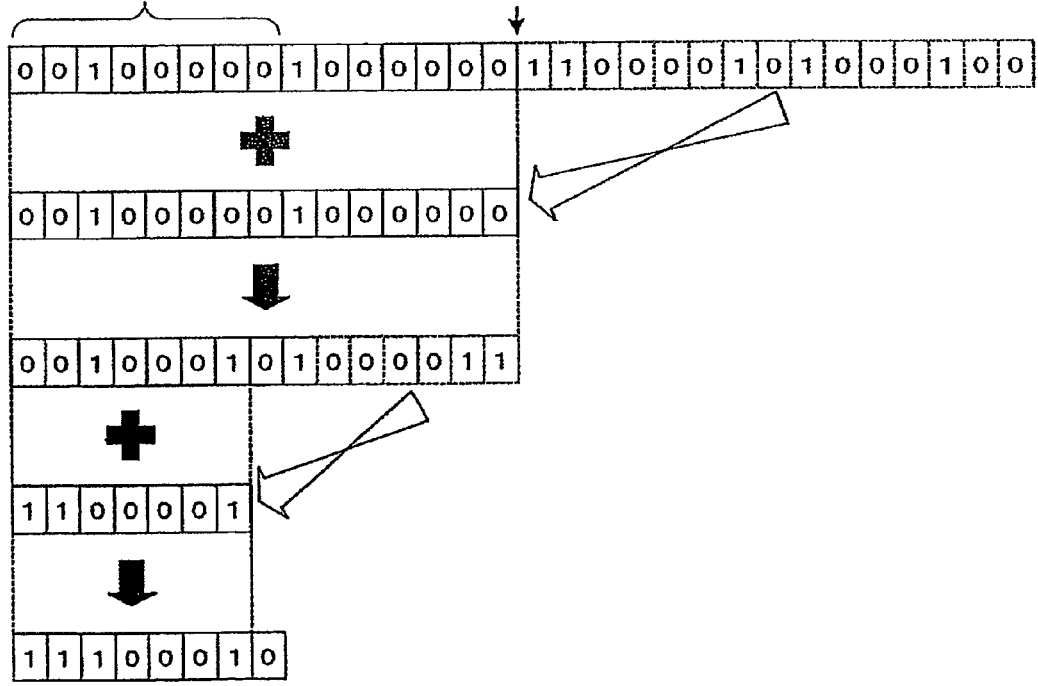
(b)
(c)

INFORMATION CREATING APPARATUS, RECORDING MEDIUM, METHOD AND RETRIEVAL METHOD UTILIZING DATA STRUCTURE CONTAINING HINT AND LINK INFORMATION

CROSS REFERENCE TO RELATED APPLICATION

The present application claims priority from Japanese Patent Application No. 2009-223503, which was filed on Sep. 28, 2009, the disclosure of which is incorporated herein by reference in its entirety.

BACKGROUND OF THE INVENTION

1. Field of the Invention

The present invention relates to a data structure and a retrieval technology, for retrieving record such as an attribute information of contents data.

2. Related Art

There has conventionally been known a content decentrally saving system in which a plurality of contents data are decentrally saved in a plurality of node apparatus, which are communicable to each other through a network. In such a kind of content decentrally saving system, each of the node apparatus utilizes a content catalog information in which attribute information of the contents data are described. Each node apparatus may retrieve a predetermined contents data and acquire contents from the other node apparatus or a content management server. The attribute information includes information about a content name, an opening start time to the public, an opening ending time and a keyword for the contents data. Each attribute information is associated with an index information such as a content ID. The content catalog information is created by the content management server and delivered to respective node apparatus. In case where new contents data are added or utilization of the contents data is completed in the content decentrally saving system, the content catalog information is updated by the content management server. The content catalog information is delivered to respective node apparatus.

An increased number of available contents data in the content decentrally saving system results in an increased amount of data of the content catalog information. Accordingly, there has been a problem that the content catalog information cannot be stored in a single node apparatus. In order to solve this problem, there has been proposed a method in which a plurality of contents catalog information sections into which the content catalog information is divided, are decentrally stored in a plurality of node apparatus. In such a method, an assigned rage of the contents data is set for the respective node apparatus. The respective node apparatus stores the content catalog information in which attribute information of the contents data for the assigned range has been described. Here, the assigned range has been determined as a range of a content ID serving as the index information. Therefore, it is possible to narrow down, upon retrieving the attribute information with a retrieval key of the content ID, the node apparatus storing the content catalog information, in which the corresponding attribute information has been described, from the content ID.

However, if a retrieval is conducted with a retrieval key of the other information than the content ID, there is no clue to narrow down the information, with the result that a full retrieval of the content catalog information is required. In this case, much retrieval time is therefore required in comparison with a case where a retrieval is conducted with a retrieval key of the content ID.

SUMMARY OF THE INVENTION

The present invention has been made in view of the above-mentioned problems. An object of the present invention is to provide an information creating apparatus, a recording medium in which an information crating program is recorded, an information creating method, etc., which permit to effectively retrieve record such as attribute information of contents data.

In order to attain the aforementioned object, according to a first aspect of the present invention, an information creating apparatus comprises: a page information storing unit that stores a plurality of page informations in a tree structure so as to be associated with information from root page information located in roots to leaf page information located in leaves; a leaf page information creating unit that creates said leaf page information comprising one or more record having a key information, which is to be compared with a retrieval key information inputted for retrieval of a record; a node page information creating unit that creates, based on said key information of said record included in said leaf page information, a judgment information, which is used to judge a possibility that that the leaf page information includes said record to be retrieved with said retrieval key information, and creates said node page information including said judgment information, said leaf page information being located in a position of child of the node page information located between said root page information and said leaf page information, and in lower positions than the above-mentioned position; and a root page information creating unit that creates said root page information, which includes said judgment information included in said node page information located in the positions of the child of said root page information, wherein: said page information storing unit stores said root page information, said node page information and said leaf page information in said tree structure.

BRIEF DESCRIPTION OF THE DRAWINGS

FIG. 5(*a*) is a view illustrating an example of a page information of a part of a catalog information;

FIG. 5(*b*) is a view illustrating an example of a state in which the hint information is synthesized;

FIG. 6(*a*) is a view illustrating an example of a content as set for a block before collapsing;

FIG. 6(*b*) is a view illustrating an example of collapsing respective block;

FIG. 6(*c*) is a view illustrating an example of collapsing respective block;

DESCRIPTION OF THE PREFERRED EMBODIMENTS

Now, the embodiments of the present invention will be described below with reference to the drawings. In the embodiments of the present invention as described below, the present invention is applied to a content decentrally saving system.

[1. Outline of Structure and Operation of a Content Decentrally Saving System]

Figure 1:
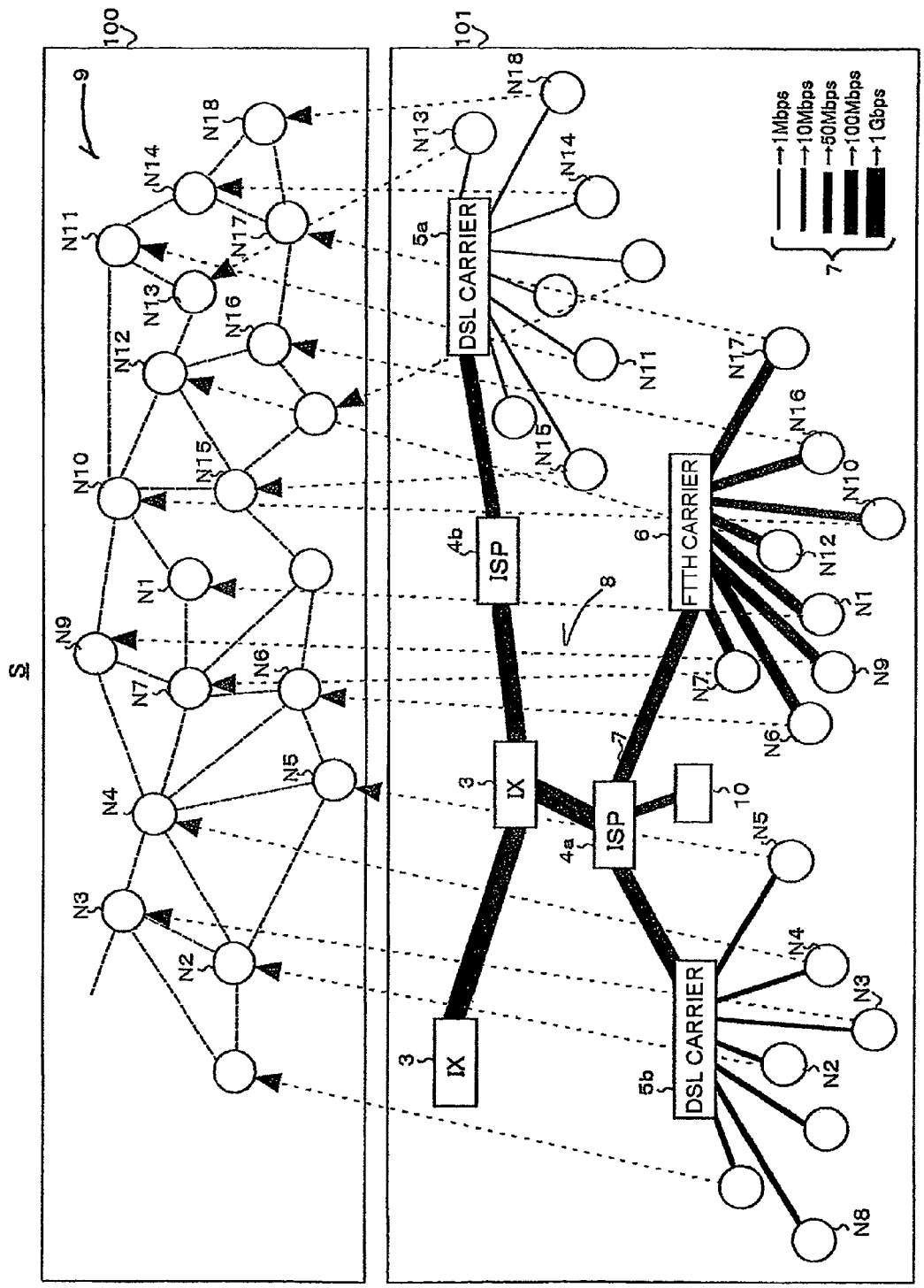
FIG. 1 is a view illustrating an example of connection mode of respective node apparatus for contents according to an embodiment of the present invention.

First, an outline of structure and operation of a content decentrally saving system according to the embodiment of the present invention will be described with reference to FIG. 1, etc. FIG. 1 is composed of a specific structure view section 101 of the content decentrally saving system "S" and a conceptual structure view section 100 of the same system. As shown in the specific structure view section 101 of the content decentrally saving system "S", the content decentrally saving system "S" is composed of a number of node apparatus "Nn" (n is any one of 1, 2, 3 - - -).

As shown in the specific structure view section 101 of FIG. 1, the content decentrally saving system is established by connecting the plurality of node apparatus "Nn" through an Internet. As shown in the lower frame section 101 of FIG. 1, the network 8 such as the internet is established by an IX (Internet eXchange) 3, an ISP (Internet Service Provider) 4a, 4b, DSL (Digital Subscriber Line) carrier's apparatus 5a, 5b, a FTTH (Fiber To The Home) carrier's apparatus 6, a communication line 7, etc. The network 8 is a communication network in the actual world. The network 8 in the example as shown in FIG. 1 includes routers, which are appropriately inserted to transfer a data packet, but are not shown in FIG. 1. A telephone communication or an optical cable is used as the communication line 7.

A plurality of node apparatus "Nn" (n is any one of 1, 2, 3 - - -) are connected to the network 8. The node apparatus will hereinafter be referred to as the "node". A unique produce serial number and an IP (Internet Protocol) address are assigned to the respective node "Nn". The content decentrally saving system "S" according to the embodiment of the present invention has a peer-to-peer network system established by connecting a plurality of any nodes "Nn" to each other as shown in the conceptual structure view section 100 of FIG. 1.

The network 9 shown in the conceptual structure view section 100 of FIG. 1 is an overlay network 9, which constitutes a virtual link created with the use of an existing network 8. The overlay network 9 of a logical network may be realized by a specific algorithm, for example, an algorithm utilizing a DHT. A node ID, a unique identification information having a predetermined number of digits, is assigned to the respective node "Nn", which is connected to the content decentrally saving system "S".

The node ID is a value that may be obtained by hashing, for example, the IP address or produce serial number, which is individually assigned to the respective node "Nn", with a common hash function. The node IDs are located to be uniformly dispersed in an ID space. For example, "SHA-1", etc. may be used as the hash function. The hashed value may have a bit length of for example 160 bit. Such node IDs are located to be uniformly dispersed in the ID space.

The connection to the content decentrally saving system "S" may be established by causing an unconnected node "Nn", for example, a node N8 to send a participation message indicating a request for participating in the content decentrally saving system to an arbitrary node "Nn" as already connected. The participation in the content decentrally saving system "S" means that the node apparatus "Nn" is connected to the content decentrally saving system "S" so as to be able to acquire contents data from the content decentrally saving system "S". The above-mentioned arbitrary node "Nn" is for example a contact node, which is always connected to the system "S".

The respective node "Nn" is provided with a routing table utilizing a DHT. The routing table sets forwarding destinations for various kinds of messages on the content decentrally saving system "S". More specifically, the routing table includes a plurality of node information registered therein, which include a node ID, an IP address and a port number of the node "Nn" located in an appropriately remote area in the ID space.

A single node, which is connected to the content decentrally saving system "S", stores node information about a minimum number of nodes "Nn" as the routing table. Various kinds of messages are transferred between nodes "Nn", with the result that node information about a node "Nn", whose node information has not as yet been stored.

Such a routing table utilizing the DHT is known from Japanese Patent Provisional Publication No. 2006-197400 and detailed description thereof will be omitted.

The content decentrally saving system "S" causes replicas of various kinds of different contents data to be saved decentrally in the predetermined forms of files. The contents data will hereinafter be referred to as the "contents". The replicas are available between the respective nodes "Nn". The original of the respective contents is saved in the central server "SA". For example, the node N5 saves a replica of the contents of a movie entitled "XXX". On the other hand, the node N3 saves a replica of the contents of a movie entitled "YYY". The replicas of the contents are saved decentrally in a plurality of nodes in this manner. The node "N" in which the replica of the contents is saved will hereinafter be referred to as the "content saving node".

Information such as a content name and a content ID, which is a unique identification information for each of the contents, is added to the respective replica of the above-described contents. The content ID may be created by for example hashing the content name and an arbitrary numerical value with the common hash function, which is used to obtain the above-mentioned node ID. Alternatively, a system administrator may provide the respective contents with a unique ID value.

A location of the replica of the contents as decentrally saved is stored by the node "Nn", etc., which administers (stores) the location of the replica of the contents as the index information. The node "Nn", which administers (stores) the location of the replica, will hereinafter be referred to as the "root node". The index information includes a set of the node information of the node "Nn" saving the replica, and the content ID of the contents. Such a root node is set as a node "Nn" having the closest node ID to the content ID. The closest node ID to the content ID may for example be a nod ID having the maximum number of coincident upper digits.

The index information on the replica of the contents of a movie entitled "XXX" may be administered for example by the node N4, which is the root node for the corresponding contents. On the other hand, the index information on the replica of the contents of a movie entitled "YYY" may be administered for example by the node N7, which is the root node for the corresponding contents. Such a root node is set as a node "Nn" having the closest node ID to the content ID. The closest node ID to the content ID may for example be a nod ID having the maximum number of coincident upper digits.

When a user of a certain node "Nn" wishes to acquire the replica of the contents as desired, the node "Nn" wishing to acquire the replica creates a message. The node "Nn" whose user wishes to acquire the replica will hereinafter be referred to as the "user node". This message is a content location inquiry message, which includes a content ID of the contents wished to be acquired and an IP address of the user node. The content location inquiry message is a message for retrieving the content saving node. The above-described content location inquiry message is sent to the other node "Nn" based on the routing table of the DHT, which is to be acquired by the user node. More specifically, the user node sends the content location inquiry message to the root node. Accordingly, the content location inquiry message finally arrives at the root node through the DHT routing with a key of the content ID.

The attribute information such as the content name and content ID of the contents is described in the content catalog information. The content catalog information is created for each page information by the central server.

The page information is information, which corresponds to a node of the tree structure in the content catalog information. Detailed description of a structure, contents, etc., of the content catalog information will be given later. The respective node "Nn" has an assigned range for the page information as saved. The assigned range is determined for example based on the node ID, etc., of the respective node "Nn". The respective node "Nn" previously acquires the page information within the own assigned range from the central server "SA" or the other node "Nn". In case where there is no necessary page information upon retrieving the attribute information of the contents, the respective node "Nn" acquires the necessary page information from the central server "SA" or the other node "Nn".

The content ID included in the above-mentioned content location inquiry message may be created by causing the user node to hash the content name with the above-mentioned common hash function. The DHT routing is known from Japanese Patent Provisional Publication No. 2006-197400 and detailed description thereof will be omitted.

The root node, which has received the above-mentioned content location inquiry message, acquires the index information corresponding to the content ID included in the message, from an index information cache. The index information as acquired is sent back to the user node, which is the source of the content location inquiry message. Thus, the user node, which has acquired the index information, may download (acquire) the replica of the contents based on the index information. The user node accesses the content saving node based on the IP address, etc., of the content saving node, which is included in the index information. The replica of the contents may be downloaded from the content saving node as accessed. In this case, the user node selects a single content saving node from the plurality of content saving nodes. The user node may connect to the content saving node as selected to download the replica of the contents.

The root node sends a content sending request message to the content saving node, which is indicated by the IP address, etc., included in the above-mentioned index information. This also enables the user node to download the replica of the contents from the above-mentioned content saving node. The above-mentioned user node may also acquire that index information from a cache node, which caches the same index information as the root node, until the content location inquiry message arrives the root node.

When the user node acquires the replica of the contents from the content saving node to save it, the user node in which the replica is saved creates a publish message. The publish message is a message to inform the root node that the replica has been saved. The publish message includes the content ID of the replica and the node information of the node apparatus, which has saved the replica. The publish message is sent to the root node. Thus, the publish message may arrive the root node based on the DHT routing utilizing a key of the content ID in the same manner as the content location inquiry message. The root node receives the publish message. The root node stores in an index information cache region the node information included in the publish message and the index information including a set of content IDs. Thus, the above-mentioned user node becomes the content saving node in which the replica of the above-mentioned contents has been saved.

[2. Structure and Contents of the Content Catalog Information]

Figure 2:
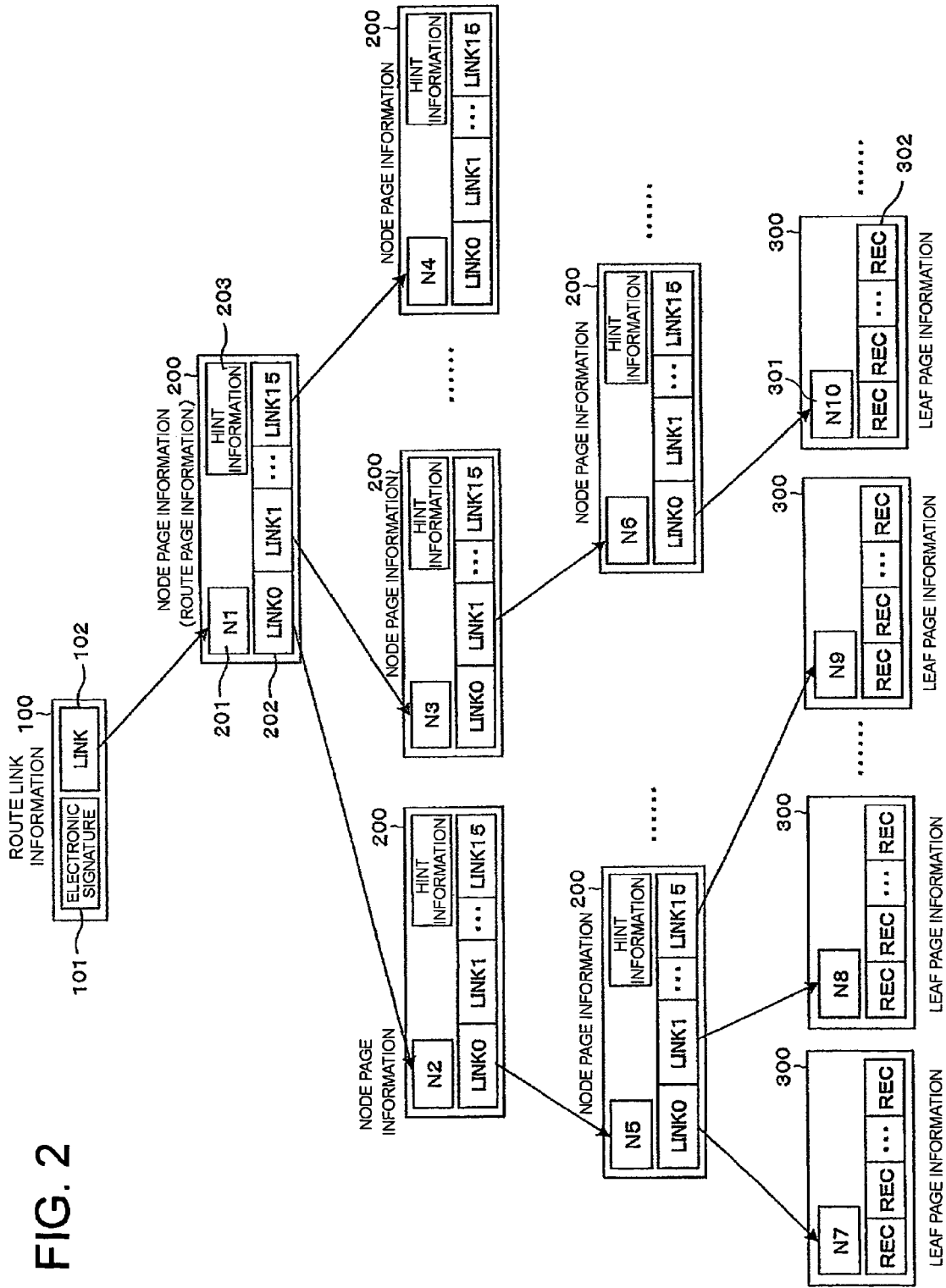
FIG. 2 is a view illustrating an example of a structure of a content catalog information according to an embodiment of the present invention.

Now, a structure and contents of the content catalog information will be describe with reference to FIG. 2.

The content catalog information will hereinafter be simply referred to as the "catalog information".

The catalog information is information to administer the attribute information of the contents in a list. The contents of the attribute information are received in a record. The catalog information is information in which one or more contents may be specified with a retrieval key. "contents may be specified" means that the record of the contents can be retrieved. Retrieval of record is conducted by the central server "SA" and also in the node "Nn".

The catalog information used in the embodiment of the present invention has a structure of retrieval tree to effectively retrieve the record.

As shown in FIG. 2, the catalog information has a structure in which the respective page information is associated with information from root page information located in roots of the tree structure to leaf page information located in leaves thereof. The root page information is an example of the root information. The page informations, which are directly associated with each other, provide a parent-child relationship. There is an assumption that a page information "Y" is associated with a certain page information "X". More specifically, the page information "X" and the page information "Y" provide a parent-child relationship. In case where, of the page information "X" and the page information "Y", a distance of the page information "X" from the root page information is small, the page information "X" is located in a position of parent in relation to the page information "Y", thus becoming a parent page information. On the other hand, the page information "Y" is located in a position of child in relation to the page information "X", thus becoming a child page information. Here, the distance from the root page information means a length corresponding to the number of links from a position of root to a node point to be noted in the tree structure. In other words, the distance from the root page information corresponds to the number of page informations, including the page information to be noted, when tracing the path from the root page information to the page information to be noted, based on the associated relationship. The page information of parent will hereinafter be referred to as the "parent page information", and the page information of child will hereinafter be referred to as the "child page information".

Association between the parent page information and the child page information is indicated in a link information. The link information, which is included in the parent page information, is information indicating the child page information. The link information includes a page number of the child page information and a message digest for checking falsification of the child page information.

The page number is a serial number, which is uniquely assigned to the page information. The page information indicated by the link information may mean the page information to which the page number included in the link information has been assigned. When a certain page information is updated, a new page number is assigned to this page information. Actually, the page number corresponds to for example a storing address at the time when storing the page information in a RAM, or a storing address of a pointer indicting a storing location of the page information. When the page information is saved in the form of file, the page number may correspond to a file name.

The message digest is information for checking falsification of the child page information, which is indicated by the link information, or of record included in the child page information, which is indicated by the link information. The message digest is a value, which may be obtained by hashing an object whose falsification is to be checked, with a common hash function.

A catalog information further includes a root link information (reference numeral 100). The root link information includes a link information to the root page information (reference numeral 102). The link information includes the page number of the root page information and the message digest. The root link information includes an electronic signature (reference numeral 101). The electronic signature is information for checking falsification of the root link information. The electronic signature further includes, for example, information such as a signature value, a certification information, etc.

The page information may be classified into a node page information (reference numeral 200) and a leaf page information (reference numeral 300).

The node page information is associated with one or more child page information. The node page information includes a page number (reference numeral 201), a link information to the child page information (reference numeral 202) and a hint information (reference numeral 203). The page number is a page number that is assigned to the node page information in which this page number is included. The node page information may include a plurality of link informations. The maximum number of link informations, which can be included in a single node page information, coincides with an order of the catalog information in the form of tree structure. This order means the maximum number of children, which are to be possessed by a single parent. More specifically, the order corresponds to a value of "n" of "nth" search tree. The hint information is information providing a clue to retrieve record with a retrieval key. The hint information will be described in detail later.

The leaf page information is a page information, which is located in leaves of a search tree, as described above. More specifically, the leaf page information has no child page information. The leaf page information includes a page number (reference numeral 301) and a record (reference numeral 302). The page number is a page number that is assigned to the leaf page information in which this page number is included.

The leaf page information includes one or more record. Attribute information about one or more contents is set in a single record. For example, a content ID, an opening start time of the contents to the public, an opening ending time thereof, a content name, a keyword, etc. are set in the record. Of the informations set as the attribute information, information to be compared with a retrieval key for retrieval of record will hereinafter be referred to as the "key" for the record. When the key for the record is for example the content name, the contents of the retrieval key also becomes the content name. The key and the retrieval key may be any information set as the attribute information. The retrieval key may for example be a numerical value, which is indicative of attribute of information included in the attribute information, such as a character string length. In this case, when conducting a record retrieve, a numerical value indicated by the retrieval key is compared with a numerical value indicating attribute of the key. The retrieval key is an example of a retrieval key information. The key is an example of key information.

The tree structure of the catalog information has an order. Inputting an index of the record causes a search to be made in accordance with an algorithm corresponding to the tree structure of the catalog information, thus making it possible to specify the leaf page information in which the record corresponding to the index is included. The index of the record is information by which the record can uniquely be specified. The content ID is used for example as the index of the record.

The structure of the catalog information has merely been described as an example, with reference to FIG. 2. Any structure may be applied as the structure of the catalog information, as long as it has a tree structure, which permits to retrieve a record of the contents.

The node page information may include not only the leaf page information, but also the record. The order of the tree structure, i.e., the maximum number of the link informations, which can be included in the single node page information, may arbitrarily be determined. The maximum number of records, which can be included in a single page information, may be set as "one" or "more". The page number, which is assigned to the page information, is not necessarily included in the page information itself.

A kind of tree may arbitrarily determined for example as a balanced tree such as a B tree and a B+tree, or a simple "n"th search tree as unbalanced. A tree may be used.

[3. Outline of the Hint Information]

Now, an outline of the contents of the hint information, as well as retrieval utilizing the hint information and creation of the hint information will be described below with reference to FIG. 3.

The hint information is information for effectively retrieving a record with a retrieval key. The hint information is included in the respective node page information, which includes the root page information. The hint information and the retrieval key as inputted are subject to an arithmetic processing based on a predetermined algorithm, when retrieving the record. As a result, there may be judged a possibility that the page information, which is located in a position of child of the node page information including the above-mentioned hint information and in lower positions than the above-mentioned position, includes the record to be retrieved with the retrieval key. This makes it possible to judge, without false negative, existence or non-existence of the record to be retrieved with the retrieval key. The "false negative" means a nature that something, which is actually positive, may be misjudged to be negative.

Figure 3:
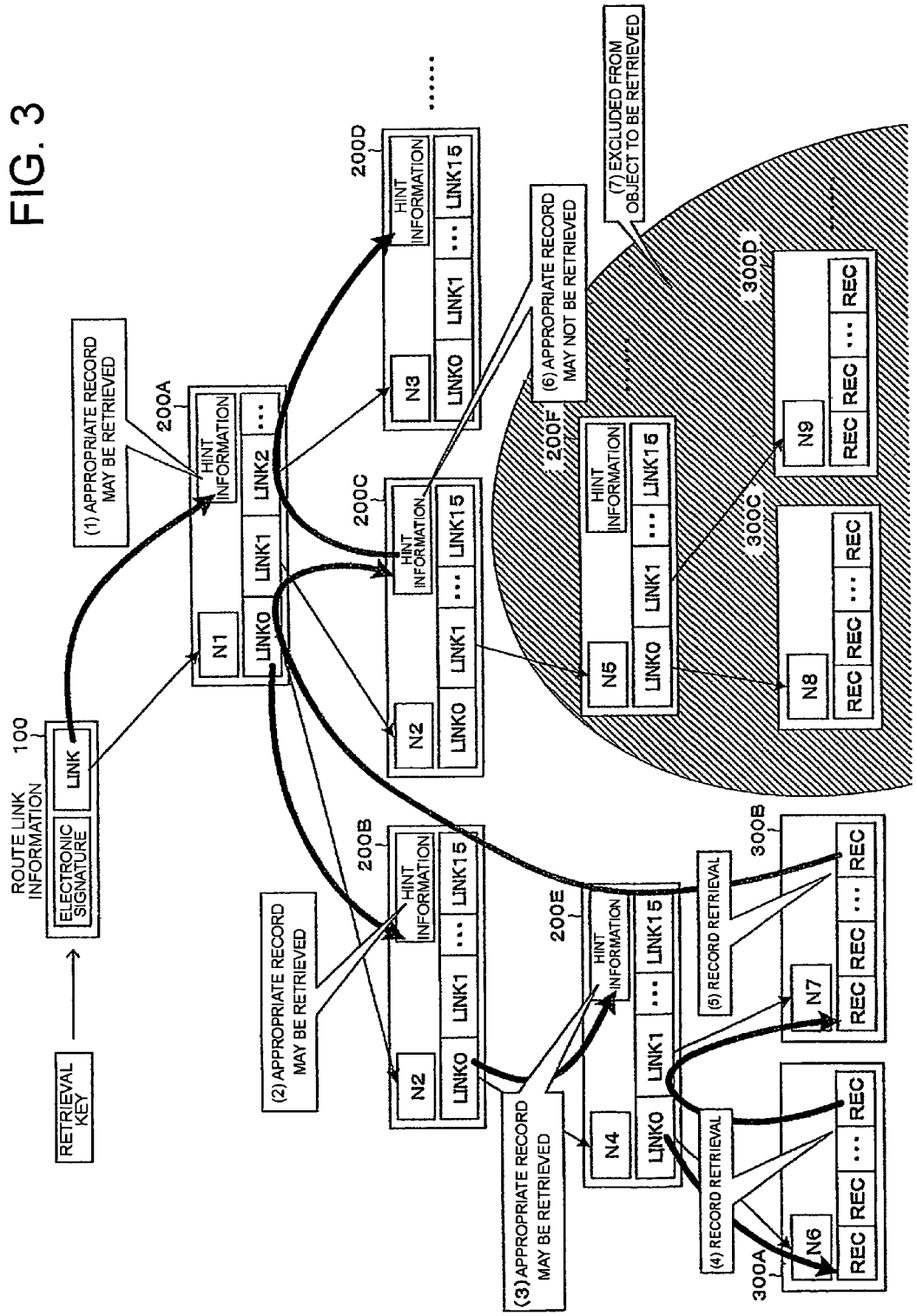
FIG. 3 is a view illustrating an example of a state in which a record is retrieved from the content catalog information.

As shown in FIG. 3, the retrieval of the record is conducted by carrying out a search to move sequentially from the root page information as the page information to be retrieved to the page information to be retrieved, while tracing a path from the root page information to the leaf page information based on the associated relationship of the link information. FIG. 3 shows an example of retrieving the record in depth first order.

More specifically, a certain retrieval key is for example inputted as shown in FIG. 3. First, the root link information is viewed and the root page information 200A is viewed based on the link information included in the root link information. There is assumed that it is judged that there is a possibility of retrieving the appropriate record based on the retrieval key and the hint information included in the root page information 200A (Stage 1). Such a case will hereinafter be simply referred to as "possible retrieval". The node page information 200B, which is located in a position of child of the root page information 200A, is then viewed based on the link information included in the root page information 200A.

There is assumed that a judgment of "possible retrieval" is made based on the retrieval key and the hint information included in the node page information 200B (Stage 2). The node page information 200E, which is located in a position of child of the node page information 200B, is then viewed based on the link information included in the root page information 200B. A judgment of "possible retrieval" is made also in the node page information 200E (Stage 3), and the leaf page information 300A, which is located in a position of child of the node page information 200E, is then viewed based on the link information included in the root page information 200E.

A retrieval of record is conducted in the leaf page information 300A by comparing for example the retrieval key and the key of the respective record (Stage 4). The record as retrieved is added to retrieval results. After completion of retrieval, a system returns to the node page information 200E, which is located in a position of parent of the leaf page information 300A, and the leaf page information 300B, which is located in a position of next child of the node page information 200E (Stage 5).

After completion of retrieval, the system returns to the node page information 200E. No further child page information exists in the node page information 200E, with the result that the system returns to the node page information 200B, which is located in a position of parent of the node page information 200E. In addition, no further child page information exists in the node page information 200B, with the result that the system returns to the node page information 200A, which is located in a position of parent of the node page information 200B.

The judgment of "possible retrieval" has already been made in the root page information 200A in Stage (1). Then, the node page information 200C, which is located in a position of child of the root page information 200A, is viewed based on the link information included in the root page information 200A. There is assumed that it is judged that there is a no possibility of retrieving the appropriate record based on the retrieval key and the hint information included in the root page information 200C (Stage 6). Such a case will hereinafter be simply referred to as "no-possible retrieval". This means that there is no record to be retrieved with the retrieval key in the leaf page information, which is located in a position of child of the node page information 200C, and in lower positions than the above-mentioned position. More specifically, any record to be retrieved with the retrieval key does not exist in the leaf page informations 300c and 300D, which are located in a position of the next child of the node page information 200F, which is located in a position of child of the node page information 200C, as shown in FIG. 3. Therefore, the node page information 200F, and the leaf page informations 300C and 300D are excluded from an object to be retrieved (Stage 7).

At this time, the system returns to the root page information 200A and the root page information 200D, which is located in a position of the further next child of the root page information 200A is then viewed.

It is possible to recognize based on the hint information that the page informations, which are located in a position of child and in lower position than the above-mentioned position, include no appropriate record, and exclusion of them from an object to be retrieved permits improvement in retrieval efficiency.

Now, a method for creating the hint information will be described below. The page information including the hint information is created by the central server "SA".

The hint information is initially set as "non-possible retrieval" as judged, even when any retrieval key is inputted. The hint information is updated when the leaf page information in which a record is included is added, or a record is added to an existing leaf page information or the record is deleted from it. In the embodiment of the present invention, the update of the hint information means recreation of the hint information. When the hint information is updated, the page information including this hint information is also recreated.

First, the leaf page information as newly added, and the node page information, which is located in a position of parent of the leaf page information to which a record is added or from which the record is deleted, are to be updated for the hint information. The hint information is created with the use of the key included in all the records, which are included in all the leaf page informations, which are located in a position of child of this node page information. The node page information is created so as to make a judgment of "possible retrieval", even if the retrieval key coinciding with the key of any record of the records included in the leaf page information.

In case where the position of child of the node page information, which is to be updated for the hint information, is associated with the node page information, the same hint information included in the node page information, which is located in a position of child, is successively used in the node page information, which is located in a position of parent. More specifically, the hint information included in the child page information is included in the parent page information. In case where a plurality of node page informations is associated with the position of child of the node page information, the hint informations included in all the node page informations, which are located in a position of child, are however synthesized to create a new hint information. The new hint information is included in the node page information, which is located in a position of parent. In this case, the synthesizing processing is conducted so as to make a judgment without false negative.

In case where the node page information and the leaf page information are associated with the position of child of the node page, the same hint information included in the node page information, which is previously located in a position of child, is successively used, or a synthesizing processing is conducted. Then, the key of the record included in the leaf page information is successively used or is reflected in the synthesized hint information. The key as reflected means that, when the retrieval key coinciding with the key of the record included in the leaf page information is inputted, the hint information is modified to make a judgment of "possible retrieval". The hint information in which the key of the record is reflected is included in the node information, which is located in a position of parent.

The update processing of the hint information is carried out sequentially from the position of child to the position of parent, for information from the leaf page information as newly added or the leaf page information, which is located in a position of parent of the leaf page information to which the record is added or from which the record is deleted, to the root page information. Accordingly, the hint informations included in the plurality of node page informations are synthesized into a single one, thus making it possible to create effectively the hint information included in the node page information of parent.

The hint information may be included not only in the node page information, but also in the leaf page information. In this case, the hint information included in the leaf page information may be created based on the key of the record, which is included in the leaf page information itself. In this case, the hint information is necessarily included in the child page information of the node page information. In case of a single child page information, the same hint information included in the child page information is successively used in the node page information. in case of a plurality of child page informations, the hint informations included in the child page informations are synthesized, and the hint information as synthesized is included in the node page information. In case of retrieving the record, conducting the following processing suffices. When a certain page information is to be retrieved, it is judged based on the hint information included in the leaf page information and the retrieval key, prior to retrieval of the record included in the leaf page information, as whether or not there is a possibility that the above-mentioned leaf page information includes the appropriate record. In case where the judgment of "possible retrieval" is made, the record included in the leaf page information to be retrieved is subjected to the retrieving processing. To the contrary, the judgment of "no-possible retrieval" is made, the record included in the leaf page information to be retrieved is not subjected to the retrieving processing.

Even when the node page information includes the record, the hint information may be created. For example, in case where the node page information is associated with a position of child of the node page information, the same hint information included in the root page information, which is previously located in a position of child, is successively used as the hint information included in the node page information, which is located in a position of parent. In case where a plurality of node page informations is associated with the positions of child, the hint informations included in the respective node informations, which is located in a position of child, are synthesized. Then, the key of the records included in the node page information and the leaf page information, which are located in a position of child, is reflected in the hint information.

[3.1 Specific Example of Hint Information]
[3.1.1 Bloom Filter]

Now, an example in which the Bloom filter is applied to the hint information will be described, as a specific example of the hint information, with reference to FIGS. 4 to 6.

The Bloom filter is used to judge whether or not a given element falls under a certain set. The Bloom filter is a data having an array structure. A bit array in which a respective element is indicated by "0" or "1" is primarily used as the array. The index of this array is a hashed value. The hashed value may be calculated based on given elements. In case where the array element corresponding to the hash value of the given element is indicated as "0", this means that the given element does not fall under the certain set, or there is no possibility that the former falls under the latter. On the other hand, in case where the array element corresponding to the hash value of the given element is indicated as "1", this means that there is a possibility that the given element falls under the certain set or the former may fall under the latter. Judgment utilizing the Bloom filter may contain misjudgment of false positive, but does not contain misjudgment of false negative. More specifically, the given element, which does not actually fall under the certain set, may be misjudged as falling under it. This is caused by the fact that the same hash value may be calculated from the different keys. However, the given element, which actually falls under the certain set, may not be misjudged as not falling under it.

In the embodiment of the present invention, the element corresponds to the retrieval key and the key. In the embodiment of the present invention, the set corresponds to a set of the keys of the record included in the page information, which is associated with the position of child of the page information in which the hint information is included, and with the lower positions than the above-mentioned position.

Figure 4:
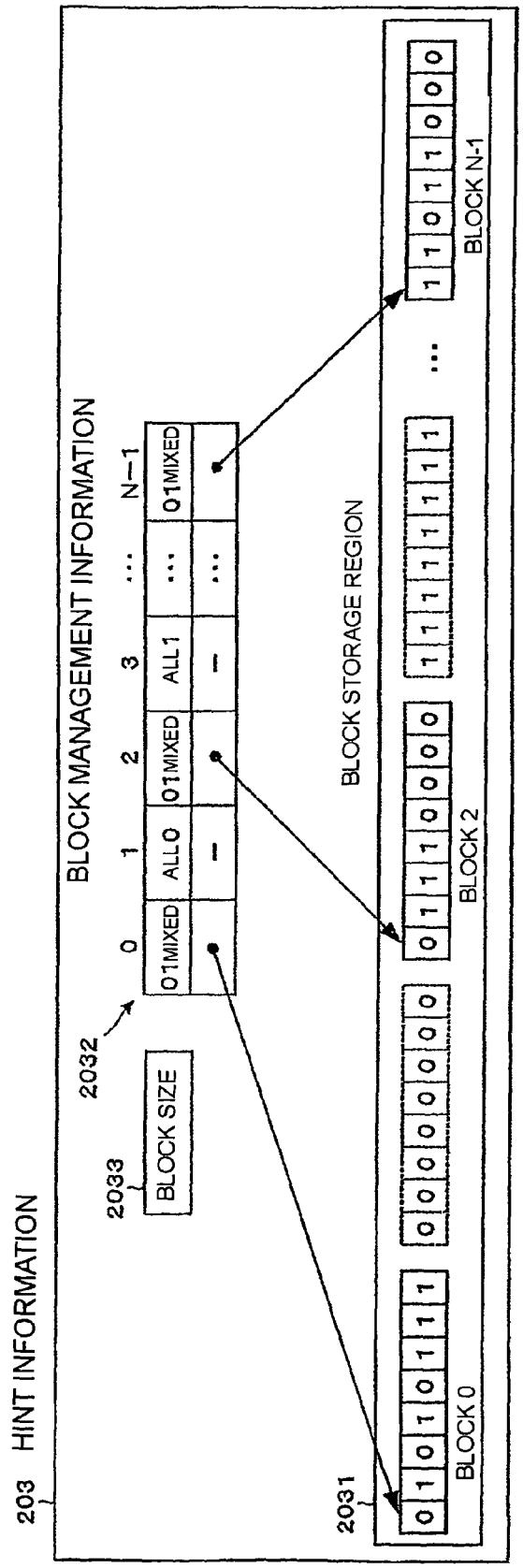
FIG. 4 is a view illustrating an example of a structure of a hint information in case where a Bloom filter is applied to the hint information.

The hint information, in case where the Bloom filter is applied, is composed of a block storage region (reference numeral 2031), block management information (reference numeral 2032) and a block size (reference numeral 2033), as shown in FIG. 4.

The block storage region is a region in which the Bloom filter is stored. The block storage region stores a plurality of blocks each having an array structure. A reason for dividing the Bloom filter into the blocks is to speed up a creating processing and a retrieval processing of the hint information. The number of elements of the array of all the blocks is predetermined. When the number of elements of a single block is for example 100, information corresponding to the hashed value of from 0 to 99 is stored in the block "0". Information corresponding to the hashed value of from 100 to 199 is stored in the block "1". More specifically, the information corresponding to the hashed value, which satisfies the following formula:

$$i \times n \leq \text{hashed value} \leq (i+1) \times n - 1$$

wherein, i being the block number and "n", the number of elements is stored in the block "i". On the assumption of the block number being "N", the maximum of the hashed value becomes "n×N−1". Each block is actually subjected to a lossless compression based on a known compression algorithm. However, each block is shown in a pre-compression state in FIG. 4.

The block management information is information to manage the respective blocks. More specifically, a type of block and a block pointer for the respective block are included in the block management information.

The type of block may include "01 mixed", "all 0" and "all 1". The type of block of "01 mixed" means that the corresponding blocks are set as both of "0" and "1". The type of block of "all 0" means that all the corresponding block are set as "0". The type of block of "all 1" means that all the corresponding block are set as "1". In case of the type of block of "01 mixed", the corresponding blocks are stored in the block storage region. To the contrary, in case of the type of block of "all 0" or "all 1", the corresponding blocks are not actually stored in the block storage region. In case of the type of block of "all 0" and "all 1", information as set in the block is apparent based on the type of block, even when the block does not actually exist. It is therefore possible to decrease the number of blocks stored in the block storage region, thus reducing the data size of the hint information. Such a type of block will be used to indicate a setting condition of the blocks in the following description. For example, the phrases of "01 mixed block", "this block is all 0", etc., will be used.

The block pointer shows a beginning address of the corresponding block. In case where the type of block is "all 0" or "all 1", an invalid address is set to the block pointer.

The block size shows the number of elements of the currently existing blocks in view of collapsing the blocks. The collapsing means reducing the number of elements of the block by dividing the block into a plurality of data, and obtaining a logical sum of these data to provide a new block. When the collapsing is not carried out, the block size corresponds to the number of the original elements of the block themselves. When the collapsing is carried out, the block size is the number of elements of the block created through the collapsing. An expanding of the block means restoring the collapsed block as the block with the number of the original elements. Detailed description of the collapsing will be given later.

In the embodiment of the present invention, the hash function used in calculation of the hashed value is the same for the hint information to be included in all the page information. In the embodiment of the present invention, the number of elements of the Bloom filter stored in the single hint information is also the same for the hint information to be included in all the page information.

When the hint information is updated, and namely the hint information is created, the hint information in which all the blocks are "all 0" is created as the initial value. More specifically, there is created the hint information in which the type of block of all the blocks is set as "all 0" and no block is included in the block storage region. Then, the hashed value is calculated for the key of record included in a leaf page information as newly added or a leaf page information to or from which a record is added or deleted. The block having the element corresponding to the hashed value is selected, utilizing the hashed value as an index. The value of element corresponding to the hashed value is set as "1" in the selected block. This processing is carried out for all the records as included.

If the block prior to the setting is the block of "all 0", the block set as "all 0" is added to the block storage region, and the element corresponding to the hashed value is set as "1" in the block as added. Then, the type of block for this block is changed as "01 mixed". If the setting for the block is conducted and all the elements of which the block is composed are set as "1", the type of block for this block is changed as "all 1". Then the region in which the blocks have been stored, is released and the other blocks are stored in this region.

The respective block for the hint information is actually subjected to a lossless compression. The respective block is subjected to the collapsing and then the lossless compression, if appropriate. When the setting for the block is conducted, the block to be set is therefore decompressed. In case of the decompressed block being collapsed, the block is expanded. After the setting, the block is collapsed again, if appropriate. Then, the block is subjected to the lossless compression again. The lossless compression will hereinafter be simply referred to as the "compression".

Comparison of the block size with the number of the original elements of the block permits to judge as whether or not the block has been collapsed. The number of the original elements is previously set as for example a predetermined constant. The Bloom filter in the hint information is divided into a plurality of blocks, and decompression, expanding, re-collapsing and re-compressing subjected to only the corresponding block accordingly suffice. Therefore, there is no need to decompress, expand, re-collapse and re-compress the entire Bloom filter, thus permitting to speed up the processing.

Now, a method of synthesizing the hint information in case where the Bloom filter is applied to the hint information will be described with reference to FIG. 5.

A plurality of node page informations are associated with positions of child of the node page information, synthesis of the hint information is conducted in the node page information in the position of parent. There is assumed that the node page information 200G and the node page information 200H are associated with the position of child of the node page information 200F. The hint information "G" is included in the node page information 200G and the hint information "H" is included in the node page information 200H.

The synthesis of the hint information is conducted between the hint information "G" and the hint information "H" for the blocks having the same block number. In case where the block 0 of the hint information "G" and the block 0 of the hint information "H" are set as "01 mixed", as shown in FIG. 5(b), a logical sum of the elements of these blocks 0 is calculated. The logical data as calculated is used for the block 0 of the hint information "F" included in the node page information 200F. In case where the block 0 of the hint information "G" is for example "10000101" and the block 0 of the hint information "H" is "01010110", the block 0 of the hint information "F" becomes "11010111". In the logical calculation, the block 0 of the hint information "G" and the block "0" of the hint information "H" are subjected to decompression, expanding, re-collapsing and re-compressing. However, the expanding and re-collapsing are carried out only when the block size is smaller than the number of the original elements of the block.

In case where the blocks 1 of the hint information "G" are "all 0" blocks and the blocks 1 of the hint information "H" are "01 mixed" blocks, the block 1 of the hint information "H" is successively used for the block "1" of the hint information "F". In case where the blocks 1 of the hint information "H" is for example "11011000", the blocks 1 of the hint information "F" is also "11011000". In this case, there is no need to conduct a logical calculation. In addition, there is no need to conduct decompression, expanding, re-collapsing and re-compressing. More specifically, setting the block 1 as compressed of the hint information "H" for the block 1 of the hint information "F" suffices. It is therefore possible to speed up the synthesizing processing of the hint information.

In case where the blocks 2 of the hint information "G" are "01 mixed" blocks and the blocks 2 of the hint information "H" are "all 1" blocks, the blocks of the hint information "F" become "all 1" blocks. In this case, there is no need to carry out a logical calculation, thus permitting to speed up the synthesizing processing of the hint information.

Methods of collapsing and expanding the hint information in case where the Bloom filter is applied to the hint information, will be described with reference to FIG. 6.

The respective blocks of the hint information are compressed. The "all 0" blocks and the "all 1" blocks are omitted. Therefore, the data size of the hint information should be reduced basically in comparison with the original data size of the Bloom filter. The node page information previously secures the hint information storage region to store the hint information. The hint information storage region is secured so that the respective blocks is smaller than the data size of the hint information, which has not been compressed, in view of the fact that the data size of the hint information becomes smaller. The size of the hint information storage region is previously set as fixed, as the maximum size of the hint information. The reason is to reduce the data size of the page information. The page information is transmitted from the central server "SA" to the node "Nn", and transmitted and received between the nodes "Nn". The smaller size of the data size of the page information permits to speed up exchange of the page information.

For these reasons, the data size of the hint information is required to be reduced to equal to or less than the upper limit size. For these purposes, compression and omission of the blocks are conducted. However, the data size of the hint information may not be reduced to the upper limit size under certain setting conditions of the block, or there are some cases where the hint information may become larger than it before compression. In view of these problems, in the embodiment of the present invention, the collapsing is carried out before the compression of the blocks, thus enabling the data size of the hint information to be reduced to be equal to or less than the upper limit size.

More specifically, in case where the data size of the hint information as compressed is equal to or less than the upper limit size, the hint information as compressed is stored in the hint information storage region. On the other hand, in case where the data size of the hint information as compressed exceeds the upper limit size, the hint information as compressed is discarded and the hint information before the compression is subjected to the collapsing. More specifically, first, a limited size is determined. The limited size indicates the number of elements of the respective block after the collapsing, i.e., a block size after the collapsing. This limited size is determined so that the data size of the hint information after the compression becomes equal to or less than the upper limit size, when the respective blocks are collapsed and then compressed. The limited size may be determined based on for example the data size of the hint information as compressed before the collapsing, and the data size of the hint information before the compressing. After determination of the limited size, the block is divided into a plurality of data in elements of the block. Then, there is calculated a logical sum of the respective elements of the data to create blocks after the collapsing. Then, the blocks as collapsed are compressed.

There is assumed that the number of the original elements of the block is "30" as shown in FIG. 6(a). More specifically, the data size of the block is 30 bits. The, there is assumed that the limited size is determined as "22" as shown in FIG. 6(b).

In this case, the block as shown in FIG. 6(a) is divided into two data, i.e., the former part of data from 1 bit to 22 bit and the latter part of data from 23 bit to 30 bit, as shown in FIG. 6(b). Then, of the former and latter parts of data, a site exchange between the higher bits and the lower bits of the latter part of data is carried out. There is assumed that the number of bits of data of the latter part is "N", the bit location is "i" (i=1, 2, 3, - - - N), the value of the respective bits in the latter data before the site exchange is "D1 (i)" and the value of the respective bits in the latter data after the site exchange is "D2 (i)". In this case, the site exchange is equivalent to making the following calculation for the respective bits:

$$D2(i)=D1(N-i+1)$$

More specifically, the latter data are "01000100", the latter data after the site exchange becomes "00100010". Then, there is calculated a logical sum of the former data of from 1 bit to 8 bit, and the later data after the site exchange. The data of the logical sum as calculated is set in the former data of from 1 bit to 8 bit. The former data thus created of the data of 22 bits become the block after the collapsing. The block size of the hint information is set as "22".

There is assumed that the limited size is determined as for example "8" as shown in FIG. 6(c). The limited size is less than a one-half of the number of the original elements of the block, and a collapsing based on the method as shown in FIG. 6(b) cannot be conducted. First, the block is collapsed into a one-half at the first stage. More specifically, the block is divided into two data, i.e., the former part of data from 1 bit to 15 bit and the latter part of data from 16 bit to 30 bit. The latter part of data is subjected to a site exchange between the higher bits and the lower bits. There is calculated a logical sum of the former data and the latter data after the site exchange to create a block with 15 bits. The first stage of the collapsing is completed in this manner.

The limited size of "8" is less than a one-half of the block size after completion of the first stage of the collapsing. So, the similar collapsing as shown in FIG. 6(b) is carried out as the second stage of the collapsing. More specifically, the block after the collapsing is divided into two data, i.e., the former part of data of from 1 bit to 8 bit and the latter part of data of from 9 but to 15 bit. The latter part of data is subjected to a site exchange between the higher bits and the lower bits. Then, there is calculated a logical sum of the former part of data of from 1 bit to 7 bit and the latter part of data after the site exchange. The data of the logical sum as calculated is set in the former data of from 1 bit to 7 bit. The data of 8 bits thus created become the final block after the collapsing. The block size of the hint information is set as "8".

If the limited size is less than a one-fourth of the number of the original elements of the block, the third stage, the fourth stage, - - - of the collapsing are then carried out.

A reverse processing to the collapsing suffices in order to expand the block as collapsed. In case where, as shown in FIG. 6(b), and more specifically, the number of the original elements is for example "30", and the limited size is "22", the block size of "22" is smaller than the number of the original elements of the block by "8". Accordingly, copies of data of from 1 bit to 7 bit of the block as collapsed are created. The data as copied is subjected to a site exchange between the higher bits and the lower bits. The data, which has been subjected to the site exchange, is connected to the end of the 22nd bit of the block as collapsed.

In case where, as shown In FIG. 6(c), and more specifically, the number of the original elements is "30, and the limited size is "8", the block size of "8" is smaller than a one-half of the number of original elements of the block and larger than a one-fourth thereof. Accordingly, copies of data of 7 bits, which is obtained by subtracting "8" of the block size from "15", which corresponds to the one-half of the number of the original elements of the block are created. More specifically, the copes of the data of from 1 bit to 7 bit of the block as collapsed are created and these copies are subjected to a site exchange between the higher bits and the lower bits. The data, which has been subjected to the site exchange, is connected to the end of the 8th bit of the block as collapsed. Thus, the block with 15 bits is created. The first stage of the expanding is completed in this manner. Then, a copy of the block with 15 bits after completion of the first stage of the expanding is created and the copy is subjected to a site exchange between the higher bits and the lower bits. The data, which has been subjected to the site exchange, is connected to the end of the 15th bit of the block after completion of the first stage of the expanding. The data of 30 bits thus created become the final block after the expanding.

The collapsing and expanding of the block may make the contents of the block as expanded different from the contents of the block before the collapsing. It is impossible that the element, which has been set as "1" before the collapsing, is set as "0" after the expanding. Accordingly, there occurs no problem of false negative. Namely, there is no misjudgment of "no-possible retrieval" of a record, although the record to be retrieved with the retrieval key as inputted is included in the leaf page information located in a position of child. On the other hand, the element, which has been set as "0" before the collapsing, is set as "1" after the expanding. This means an increase in false positive. Namely, there is a high probability of judgment of "possible retrieval" of an appropriate record, although the record to be retrieved with the retrieval key as inputted is not included in the leaf page information located in a position of child. In case where a hint information of a certain node information is for example collapsed, there may be misjudged as "possible retrieval" of the record, although there should have been judged as "no-possible retrieval" of the record if the collapsing was not conducted. However, even in such a case, it is possible to make a judgment again with the use of the hint information of the node page information, which is located in a position of child of the node page information. There is no misjudgment of "possible retrieval", unless the hint information of the node page information located in this position of child is collapsed. Therefore, the increase in false positive does not cause inconvenience.

The structure of the hint information in case where the Bloom filter is applied, and the method for creating the hint information, have been described merely as an example. The data size of the array elements of the Bloom filter may be increased for example than 1 bit. In this case, the element corresponding to the hashed value of the key may be incremented by one to reflect the key in the hint information, rather than setting the corresponding element as "1". In this case, when synthesizing the hint information, an addition operation may be made to obtain the sum for the respective elements, rather than calculating a logical sum. In this case, a configuration suffices in which, in case where the value of the element corresponding to the hashed value of the retrieval key as inputted, upon retrieving a record, is one or more, a judgment of "possible retrieval" is made, and in case where the value of the element corresponding to the hashed value of the retrieval key as inputted, is "0", a judgment of "no-possible retrieval" is made.

The way of dividing the block when conducting the collapsing is not limited only to the way described above. For example, the way of dividing the block into three or more parts may be applicable, in place of the way of dividing the block into two parts. The data as divided are not necessarily to subjected to a site exchange between the higher bits and the lower bits.

Managing the Bloom filter in a plurality of blocks as divided, the compressing and the collapsing are not essential.

[3.1.2 Range of Numerical Values]

Now, description of a specific example of the hint information, i.e., an example in which the range of numerical values is applied to the hint information will be described below. This is effective in case where, for example, the key is a numerical value information, or an attribute of the key is a numerical value information. The numerical value information may also include integers, real numbers, as well as time and date, etc.

The hint information is indicated by the lower limit and the upper limit of the numerical value information. More specifically, the hint information is indicative of a range of a numerical value information. There is assumed that, the key is time and date, and the keys of the respective record are "2009/08/05", "2009/12/01", "2008/09/10" and "2009/04/29". In this case, of these keys, the minimum key, i.e., the oldest date of "2008/09/10" serves as the lower limit of the hint information. On the other hand, of these keys, the maximum key, i.e., the newest date of "2009/12/01" serves as the upper limit of the hint information. Thus, the hint information is indicative of a range between "2008/09/10" and "2009/12/01".

When conducting a retrieval of a record, a comparison between the retrieval key and the hint information is made. The retrieval key is included in the range defined by the hint information, thus meaning "possible retrieval". On the other hand, the retrieval key is not included in the range defined by the hint information, thus meaning "no-possible retrieval". On the assumption that the hint information indicates a range between "2008/099/10" and "2009/12/01", when any date within the range of "2008/099/10" and "2009/12/01" is inputted as the retrieval key, a judgment of "possible retrieval" is made. On the other hand, when any date before "2008/09/10" or after "2009/12/01" is inputted, a judgment of "no-possible retrieval" is made. In the judgment utilizing the range of numerical value, there may be a misjudgment due to false positive, but no misjudgment due to false negative.

The synthesizing of the hint information is conducted based on the range defined by the hint information respectively included in the plurality of node page informations, which are located in a position of child. More specifically, the smallest lower limit of the lower limits of the respective hint informations to be synthesized serves as a new lower limit. The largest upper limit of the upper limits of the respective hint information to be synthesized serves as a new upper limit.

The hint information, which indicative of the new lower limit and the new upper limit, is included in the node page information located in a position of parent. In case where the hint information to be synthesized is indicative of "2008/09/10~2009/12/01", "2008/04/02~2010/02/15" and "2009/06/22~2010/06/03", the hint information indicating "2008/04/02~2010/06/03" is created. It is therefore possible to judge, from the minimum lower limit and the maximum upper limit of the hint information included in the page information, which is located in a position of parent, as whether or not a record to be retrieved with the predetermined key is include in the page information located at a position of child of the page information located in a position of parent. It is only necessary to include the minimum lower limit and the maximum upper limit in the information included in the page information located in a position of parent, thus making it possible to reduce the data size of the hint information.

The specific example of the hint information has been described merely as an example. The other hint information than the Bloom filter and the range of numerical values may be applied. An automaton may be applied to the hint information.

[4. Structure, Etc., of a Central Server "SA"]

Now, a structure and a function of the central server "SA" will be described with reference to FIG. 7.

Figure 7:
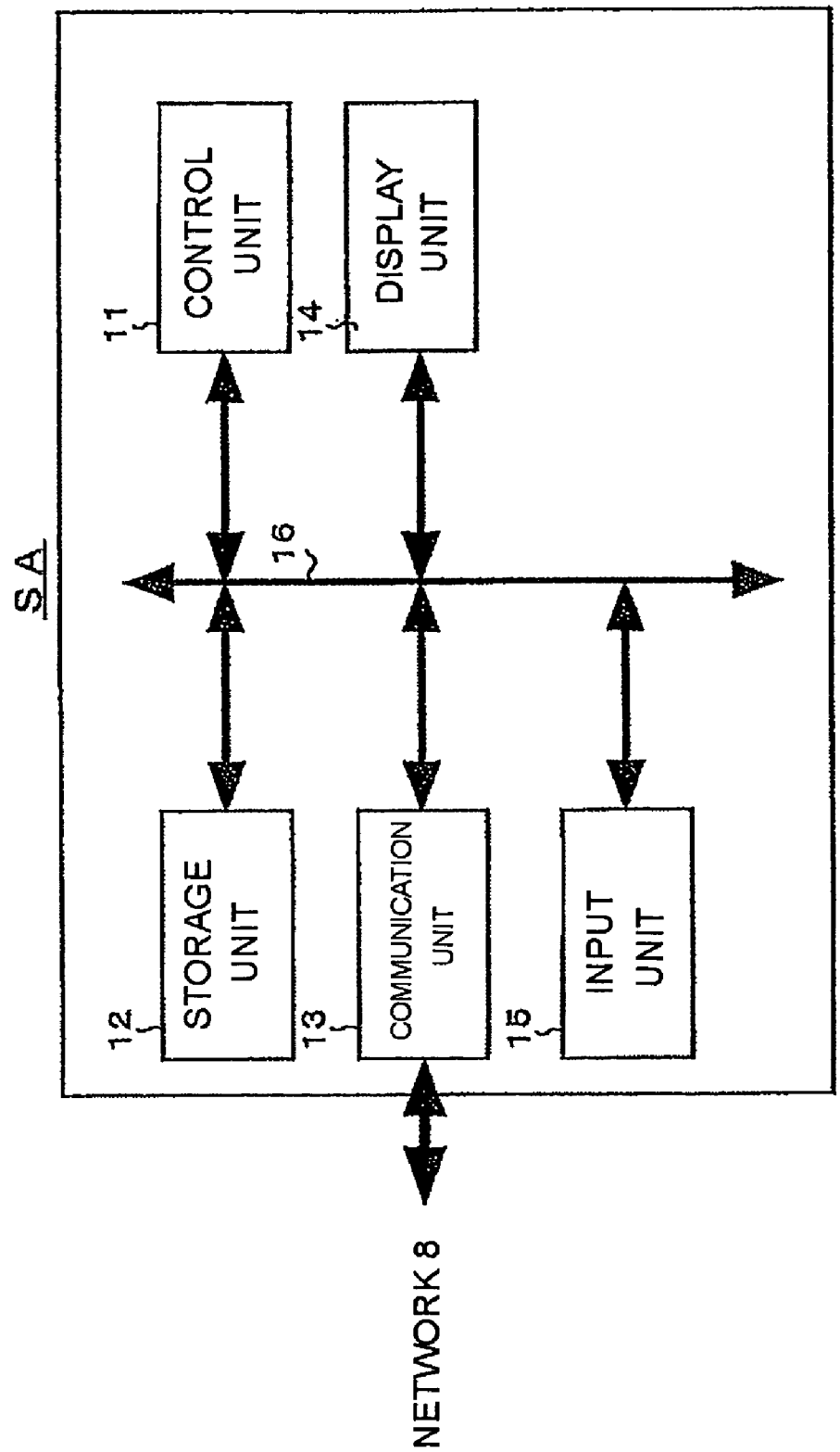
FIG. 7 is a view illustrating an example of a schematic structure of a central server "SA"

The central server "SA" is provided with a CPU having a calculation function, an RAM for work, and a control unit 11 composed of a ROM for storing various data and programs, etc., as shown in FIG. 7. In addition, the central server "SA" is provided with a storage unit 12 composed of a HD for storing various data and programs, etc. Further, the central server "SA" is provided with a communication unit 13 for communication control of information between the nodes "Nn" through a network 8. Further, the central server "SA" is provided with a display unit 14 of a CRT, a liquid crystal display, or the like to display various information. Further, the central server "SA" is provided with an input unit 15 (e.g., a keyboard, a mouse, etc.) to receive instruction from an operator and send an instruction signal corresponding to the above-mentioned instruction to the control unit 11. The control unit 11, the storage unit 12, the communication unit 13, the display unit 14 and the input unit 15 are connected to each other through a buss 16. The storage unit 12 serves as an example of a page information storing unit. The input unit 15 serves as an example of a retrieval input unit. The storage unit 12 may be a volatile memory or a non-volatile memory.

The storage unit 12 stores a node ID, an IP address and a port number of the respective nodes "Nn". A catalog database in which a catalog information may be registered for the root link information and the page information is established in the storage unit 12. In addition, the storage unit 12 stores a database management program for managing the catalog database. The database management program is an example of the information creating program.

The above-mentioned database management program may be downloaded for example from a predetermined server on the network 8. The above-mentioned database management program may be recorded in for example a recording medium such as a CD-ROM so as to be readable by a drive for the recording medium.

[5. Structure and Function of the Node "Nn"]

Figure 8:
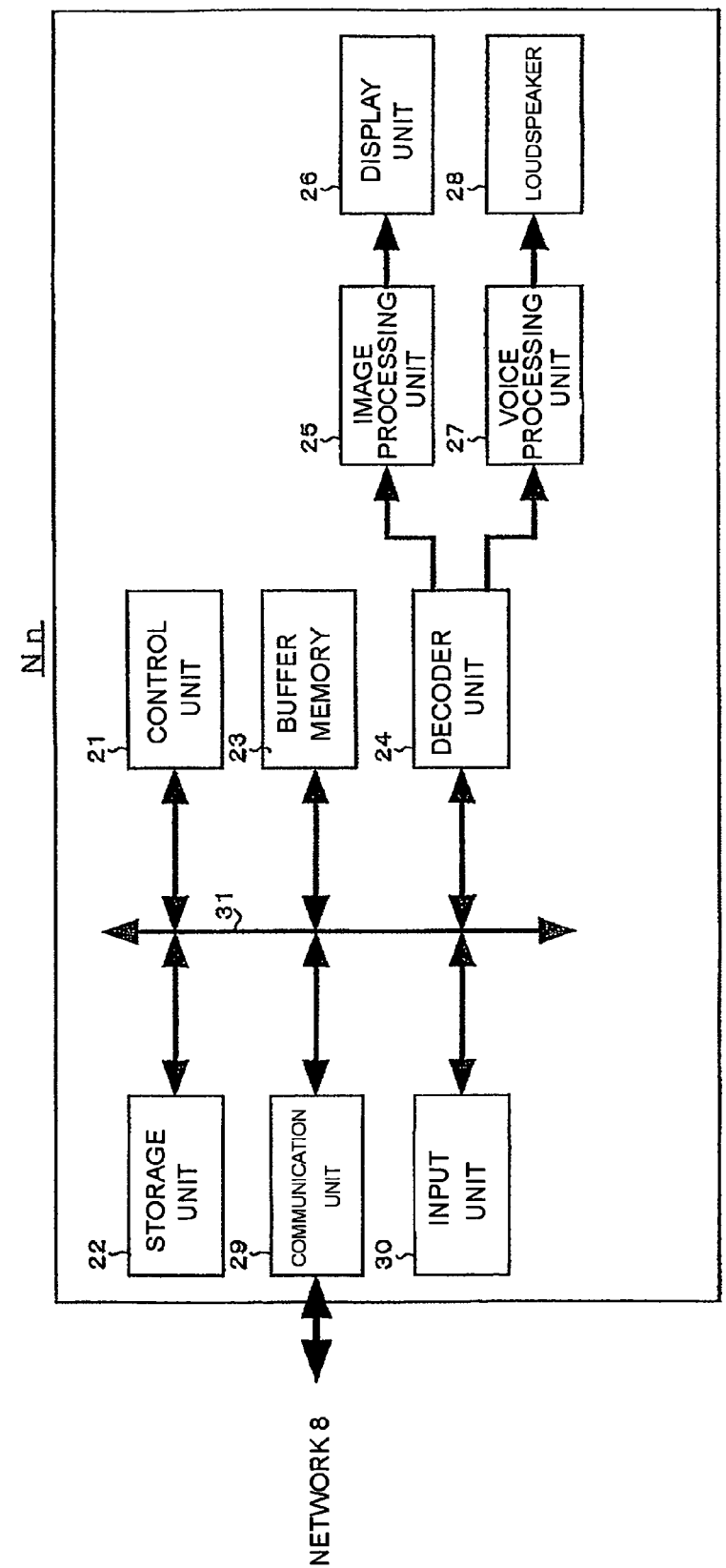
FIG. 8 is a view illustrating an example of a schematic structure of a node "Nn"

A structure and a function of the node "Nn" will be described with reference to FIG. 8.

The respective node "Nn" is provided with a CPU having a calculation function, an RAM for work, and a control unit 21, which serves as a computer and is composed of a ROM for storing various data and programs, etc. The respective node "Nn" is provided with a storage unit 22 composed of a HD (hard disc) to store and save various data and programs, etc., and with a buffer memory 23 to temporarily store a replica of the received content. Further, the respective node "Nn" is provided with a decoder unit 24 to decode video data (image information) as encoded and audio data (audio information) as encoded, which are included in the replica of the content. Further, the respective node "Nn" is provided with an image processing unit 25, which applies a predetermined image processing to the video data as decoded and outputs the same as a video signal, and with a display unit 26 such as a CRT, a liquid crystal display, etc., to display an image based on the video signal as outputted from the image processing unit 25. Further, the respective node "Nn" is provided with an audio processing unit 27, which D (Digital)/A (Analog)-converts the above-mentioned audio data as decoded into an analog audio signal and then causes an amplifier to amplify it and outputs the same, and with a loudspeaker 28, which outputs the audio signal outputted from the audio processing unit 27 in the form of an acoustic wave. Further, the respective node "Nn" is provided with a communication unit 29 for communication control of information between the nodes "Nn" through the network 8. Further, the respective node "Nn" is provided with an input unit 30 (e.g., a keyboard, a mouse, a remote controller, an operation panel, etc.) to receive instruction from an operator and send an instruction signal corresponding to the above-mentioned instruction to the control unit 21. The control unit 21, the storage unit 22, the buffer memory 23, the decoder unit 24, the communication unit 29, and the input unit 30 are connected to each other through a buss 31. The storage unit 22 serves as an example of the second page information storing unit. The input unit 30 serves as an example of the second retrieval input unit. A personal computer, a STB (Set Top Box), etc., may be applicable as the node "Nn".

The storage unit 22 stores a routing table utilizing a DHT, an index, as well as an IP address and a port number of a contact node, which is to be accessed when participating in the content decentrally saving system "S", and an IP address and a port number of a central server "SA". The storage unit 22 stores the page information acquired from the other node "Nn" or the server "SA", in the form of file.

A node program may be downloaded for example from a predetermined server on the network 8 or may be recorded in for example a recording medium such as a CD-ROM so as to be readable by a drive for the recording medium.

[6. Operation of Content Decentrally Saving System "S"]

Now, an operation of the content decentrally saving system "S" according to the embodiment of the present invention will be described with reference to FIGS. 9 to 16.

The description will be given below on the assumption that the catalog information has at least a structure of a "nth" search tree as generally used. Detailed description of specific processing to a kind and structure of a tree is omitted. There is assumed that a Bloom filter having a structure of a bit array is applied to the hint information. An operation in case where a range of numerical values is applied to the hint information will be described suppimentarily as appropriate.

[6.1 Operation of Central Server "SA"}

Figure 9:
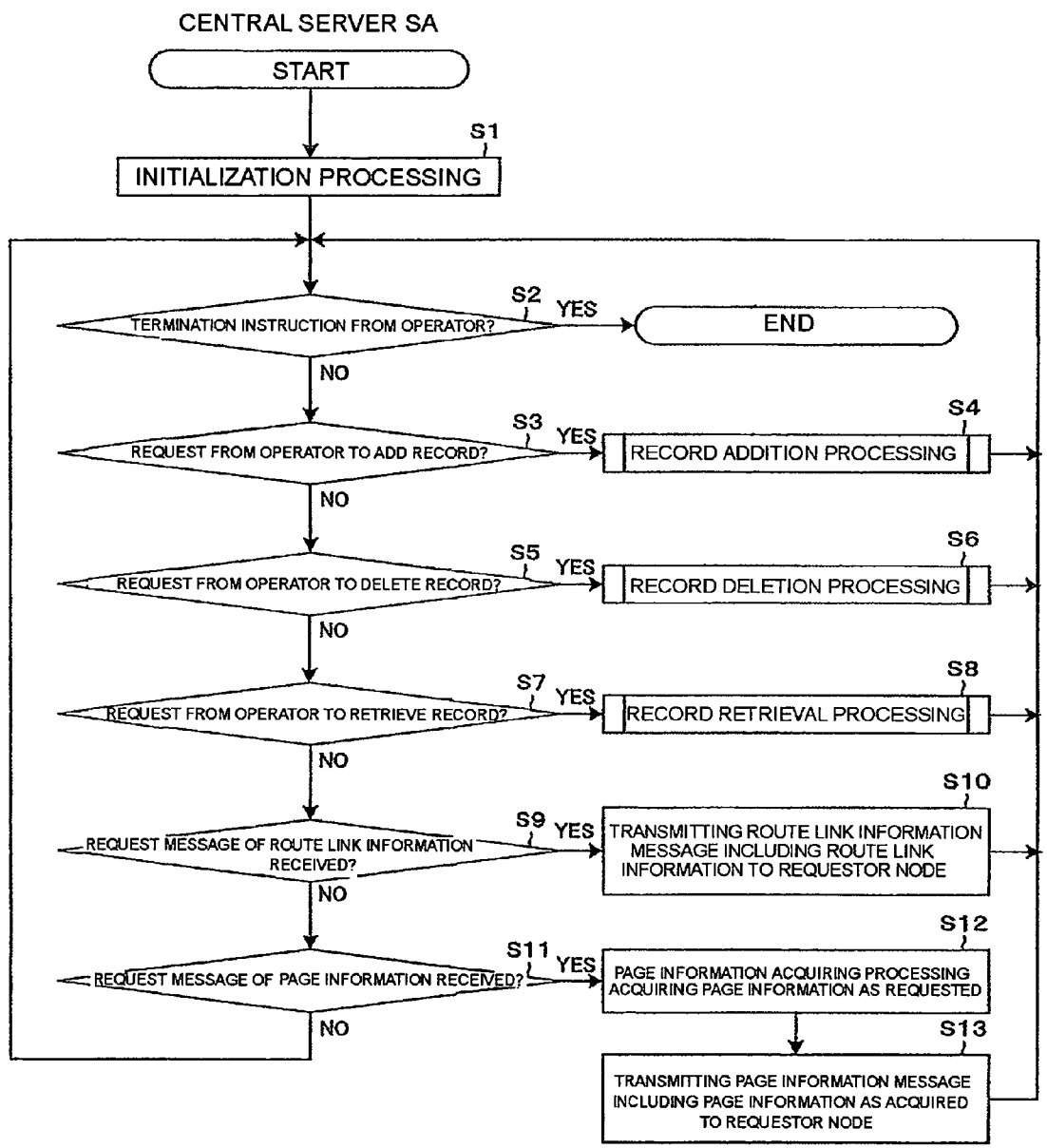
FIG. 9 is a flowchart showing an example of processing of a control unit 11 in the central server "SA" according to an embodiment of the present invention.
Figure 10:
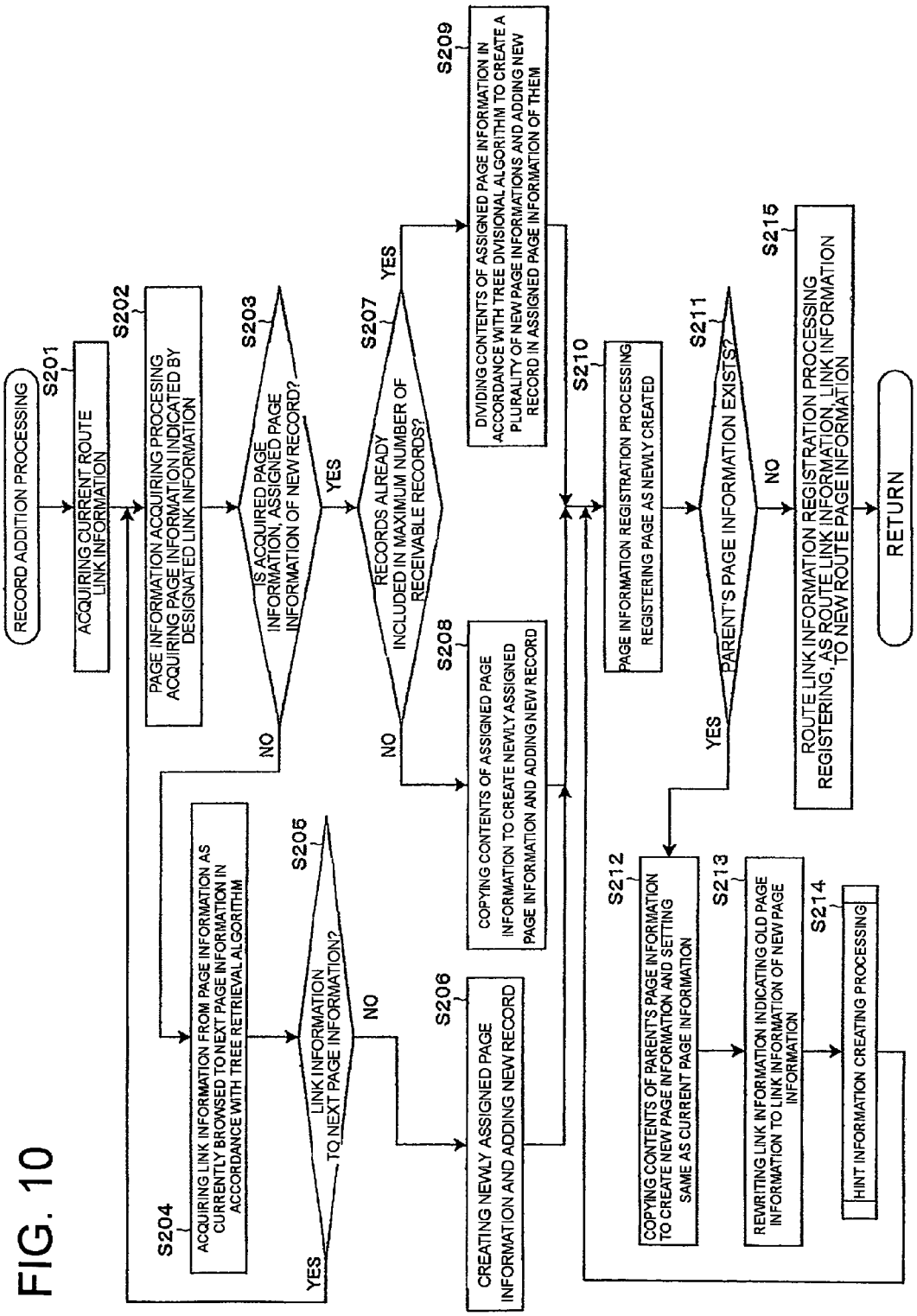
FIG. 10 is a flowchart showing an example of processing in a record addition processing of the control unit 11 in the central server "SA" according to the embodiment of the present invention.
Figure 11:
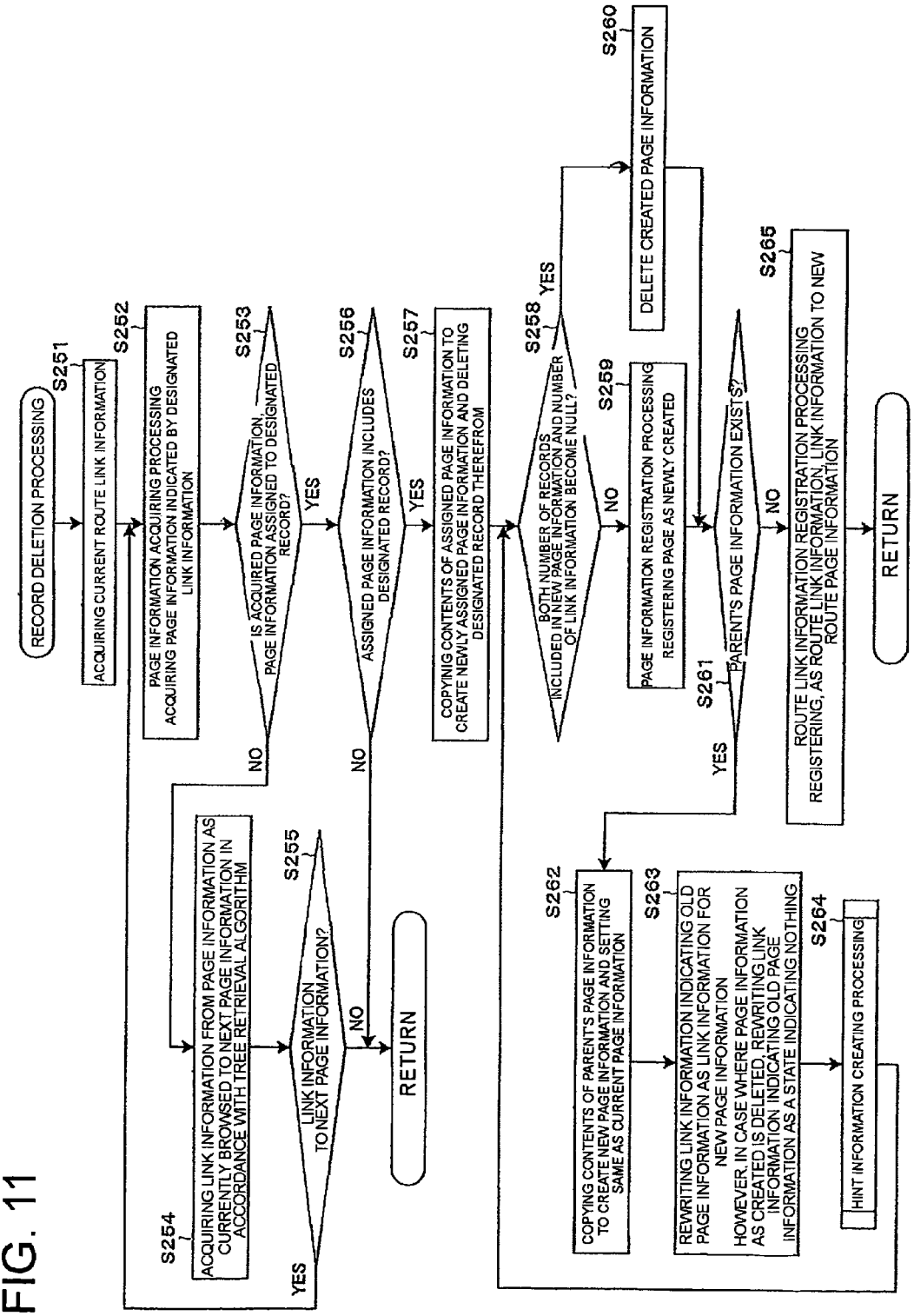
FIG. 11 is a flowchart showing an example of processing in a record deletion processing of the control unit 11 in the central server "SA" according to the embodiment of the present invention.

The processing as shown in FIG. 9 starts when starting up for example the database management program. First, the control unit 1 executes an initialization processing (Step S1). In case where the root link information has been already been created, there are carried out a step of reading out the root information and a step of making a falsification check of the root information as read out, in the initialization processing. In case where the root link information has not as yet been created, a root link information is newly created. The root link information is stored in the RAM.

Then, the control unit 11 makes a judgment whether or not a final instruction from an operator has been made, based on the input from the input unit 15 (Step S2).

In case of no final instruction in Step S2 (No in Step S2), the control unit 11 judges based on the input from the input unit 15 whether or not a request from an operator to add a record has been made (Step S3). When the request to add a record has been made (YES in Step S3), the control unit 11 executes a record addition processing (Step S4). At this time, the control unit 11 specifies a new record as inputted from the input unit 15 through for example the operation by the operator. The control unit 11 specifies an index of the new record. In this record addition processing, the new record as inputted is added to the catalog information. Detailed description of the record addition processing will be given later.

In case where there is no request to add the record in Step S3 (No in Step S3), the control unit 11 judges based on the input from the input unit 15 whether or not a request from the operator to delete the record has been made (Step S5). In case where the request to delete the record has been made (YES in Step S5), the control unit 11 executes a record deletion processing (Step S6). At this time, the control unit 11 specifies an index of the record to be deleted, as inputted from the input unit 15 through the operation by the operator. In this record deletion processing, the record to be deleted, which corresponds to the specified index, is deleted from the catalog information. Detailed description of the record deletion processing will be given later.

In case where there is no request to delete the record in Step S5 (No in Step S5), the control unit 11 judges based on the input from the input unit 15 whether or not a request from the operator to retrieve the record (Step S7). In case where the request to retrieve the record has been made (YES in Step S7), the control unit 11 executes a record retrieval processing (Step S8). At this time, the control unit 11 specifies the retrieval key as inputted from the input unit 15 through the operation by the operator. In this record retrieval processing, the record is retrieved with the retrieval key as specified from the catalog information. Detailed description of the record retrieval processing will be given later.

In case where there is no request to retrieve the record (No in Step S7), the control unit 11 judges whether or not a request message of root link information has been received (Step S9). In case where the request message of root link information has been received (YES in Step S9), the control unit 11 sends the root link information included in the root link information message to a node "Nn" as a requester (Step S10).

In case where the request message of root link information has not been received in Step S9 (No in Step S9), the control unit 11 judges as whether or not a request message of page information has been received (Step S11). In case where the request message of page information has been received (YES in Step S11), a page information acquiring processing is executed (Step S12). At this time, the control unit 11 specifies the link information included in the request message of page information. The above-mentioned link information is indicative of the page information as requested. In the page information acquiring processing, the page information indicating the link information as specified is acquired from a file and then stored in the RAM. After acquiring the page information as requested, the control unit 11 sends the page information included in the message of page information to a node "Nn" as a requester (Step S13)

After completion of the processing of Steps S4, S6, S8, S10 and S13, or in case where the request message of page information has not received in Step S11 (No in Step S11), the control unit 11 causes the system to move to Step S2. In case where a termination instruction from an operator has been given in Step S2 (YES in Step S2), the control unit 11 quits the processing.

First, the control unit 11 acquires the current root link information from the RAM (Step S201). Then, the control unit 11 executes the page information acquiring processing (Step S202). At this time, the control unit 11 specifies the root link information. In the page information acquiring processing, the page information indicating the link information as specified is acquired from a file and then stored, in the RAM. The page information as acquired is used as the page information to be currently viewed.

Then, the control unit 11 determines an assigned page information based on the index as specified. The assigned page information means a page information based on which a certain record is to be stored. In case where a record is added, the assigned page information is a leaf page information in which a new record as inputted is to be included.

More specifically, the control unit 11 judges whether or not the page information as acquired is the assigned page information for the new record (Step S203). This judgment depends upon a structure of the page information.

In case where the page information as acquired is not the assigned page information for the new record (No in Step S203), the control unit 11 acquires a link information to a next page information, from the page information as currently viewed (Step S204). The nest page information means a page information, which is to be next viewed, of the child page informations of the page information currently viewed. The page information to be next viewed corresponds to the index as specified. This processing is executed based on a retrieval algorithm corresponding to a structure of a retrieval tree for the catalog information.

Then, the control unit 11 judges whether or not the link information to the next page information exists (Step S205). More specifically, the control unit 11 judges whether or not the link information to the next page information could be acquired. At this time, in case where the link information to the next page information does not exist (NO in Step S205), the control unit 11, which serves as the leaf page information creating unit, creates a new assigned page information on the RAM (Step S206). The control unit 11 adds, for setting, a new record to the assigned page information as created.

In case where the link information to the next page information exists (YES in Step S205), the control unit 11 causes the system to move to Step S202. At this time, the control unit 11 specifies the link information as acquired in Step S204 and executes the page information acquiring processing.

In case where the page information as acquired is the assigned page information for the new record in Step S203 (YES in Step S203), the control unit 11 judges whether or not the new record can be added to the assigned page information as determined. More specifically, the control unit 11 judges whether or not the assigned page information already includes the records in the maximum number of records being capable of being included (Step S207). At this time, in case where the records are not included in the maximum number of records being capable of included (NO in Step S207), the control unit 11, which serves as the leaf page information creating unit, makes a copy of the contents of the current assigned page information to create a new assigned page information on the RAM (Step S208). The control unit 11 adds, for setting, the new record to the new assigned page information.

In case where the records are included in the maximum number of records being capable of included (YES in Step S207), the control unit 11 divides, on the other hand, the page information (Step S209). More specifically, the control unit 11 divides the contents of the current assigned page information to create a plurality of new page informations on the RAM, based on a division algorithm corresponding to a structure of a retrieval tee for the catalog information. The control unit 11 adds, for setting, the new record to the assigned page information of these new page informations.

After completion of creation of the new assigned page information in Steps S206, S208 or S209, the control unit 11 executes a page information registration processing (Step S210). At this time, the control unit 11 specifies the page information as newly created. In the page information registration processing, the link information to the page information as specified is created, and this page information is stored in a file. The page information is registered in this manner. In case where the assigned page information is divided into a plurality of new page informations, the respective new page informations are subjected to the page information registration processing.

Then, the control unit 11 judges whether or not a parent page information of the page information as registered exists (Step S211). It is preferable to save in a predetermined region of the RAM a page number of the page information viewed at the every time when it is judged in Step S205 that the link information to the next page exists. Reference to the predetermined region as mentioned above permits to judge whether or not the parent information exists, and specify the page number of the above-mentioned parent information.

In case where the parent information exists (YES in Step S211), the control unit 11 re-creates the respective node page informations extending from the parent page information of the leaf page information as newly created to the root page information. More specifically, the control unit 1 creates a parent page information, which includes the link information including a message digest of the child page information and the page number of this child page information. In more detailed description, the control unit 11 makes a copy of the contents of the original parent page information to create a new parent page information on the RAM (Step S212). The control unit 11 utilizes the new parent page information as the page information to be currently viewed.

Then, the control unit 11 rewrites the link information indicating the old child page information included in the page information to be currently viewed as the link information indicating the new child page information (Step S213). More specifically, the control unit 11 modifies the link information, which has been created through the page information registration processing in Step S210, as the link information indicating the new child page information. Then, the control unit 11 overwrites the link information indicating the new child page information on the link information indicating the old child page information.

Then, the control unit 11 executes a hint information creating processing (Step S214). In the hint information creating processing, the hint information is created and the thus created hint information is included in the page information as currently viewed. Detailed description of the hint information creating processing will be given later.

Then, the control unit 11 causes the system to move to Step S210. At this time, the control unit 11 specifies the page information, which has been newly created and is currently viewed, and executes the page information registration processing. The page information as currently viewed is registered in this manner.

In case where the parent page information of the page information s registered does not exist, and namely, the page information as registered is the root page information in Step S211 (NO in Step S211), the control unit executes a root link information registration processing (Step S215). In the root link information registration processing, a root link information indicating the new root page information as registered is created and the root link information as created is delivered to all the nodes "Nn". After completion of the root link information registration processing, the control unit 11 quits the record addition processing.

First, the control unit 11 executes the processing of Steps S251 to S255. The processing is basically the same as the processing of Step S201 to S205 in the record addition processing. In case where the link information to the next page information does not exist in Step S255 (NO in Step S255), the control unit 11 however causes a record deletion processing to quit. More specifically, the page information in which a record to be deleted is included does not exist, the record deletion processing quits here.

In case where the page information as acquired is the assigned page information of a record to be deleted in Step S253 (YES in Step S253), the control unit 11 judges whether or not the assigned page information includes the record to be deleted (Step S256). This judgment depends upon a structure of the catalog information. In case where the assigned page information does not include the record to be deleted (NO in Step S256), the record deletion processing quits.

In case where the assigned page information includes the record to be deleted (YES in Step S256), on the other hand, the control unit 11, which serves as the leaf page information creating unit, creates a leaf page information in which one or more records is included. More specifically, the control unit 11 makes a copy of the contents of the current assigned page information to create a new assigned page information on the RAM (Step S257). Then, the control unit 11 deletes the record to be deleted, from the new assigned page information.

Then, the control unit 11 judges whether or not both of the number of records and the number of link informations, which are included in the new page information as created, have become null (Step S258). More specifically, the control unit 11 judges whether or not the new page information as created has become empty. At this time, in case where the new page information as created has not become empty (NO in Step S258), the control unit 11 specifies this page information and executes the page information registration processing (Step S259). The new page information from which the record to be deleted has been deleted is registered in this manner.

In case where the new page information as created has become empty (YES in Step S258), on the other hand, the control unit 11 deletes the page information, which has been judges as being empty in Step S258, from the RAM (Step S260).

After completion of Step S259 or S260, the control unit 11 executes the processing of Steps S261 to S265. The processing is basically the same as the processing of Step S201 to S205 in the record addition processing. In case where the child page information has been deleted in Step S260, the control unit 11 rewrites the link information indicating the old child page information in a state indicating nothing in Step S263. For example, invalid values are set as the page number and the message digest. After completion of Step S265, the control unit 11 quits the record deletion processing.

Figure 12:
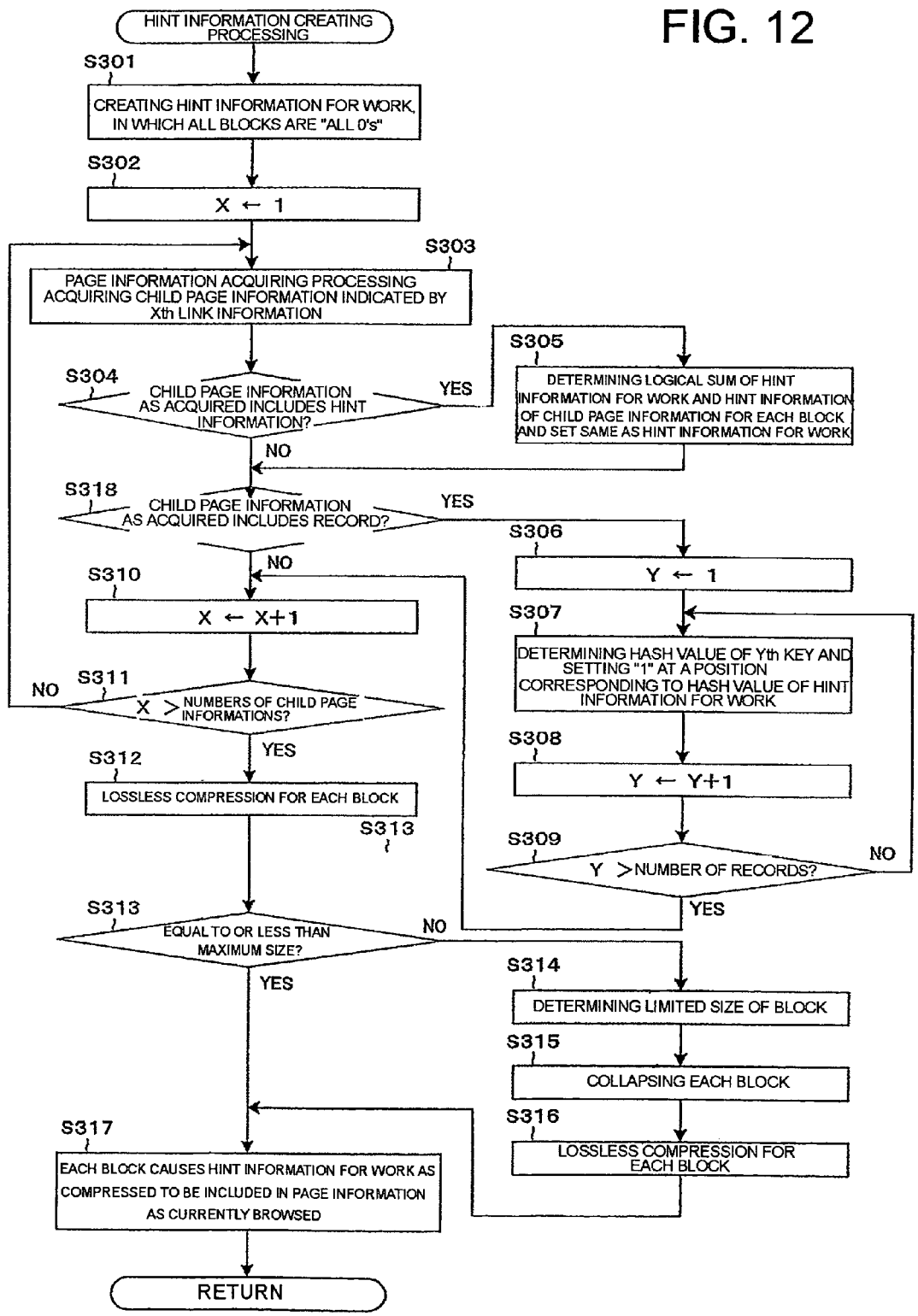
FIG. 12 is a flowchart showing an example of processing in a hint information creating processing of the control unit 11 in the central server "SA" according to the embodiment of the present invention.

FIG. 12 is a flowchart showing an example of processing in a hint information creating processing of the control unit 11 in the central server "SA" according to the embodiment of the present invention First, the control unit 11 creates the hint information for work in which all the blocks are "all 0", on the RAM (Step S301). At this time, the control unit 11 executes an initialization processing for the block size and the block management information. Then, the control unit 11 sets the link number "X" as "1" (Step S302). Then, the control unit 11 executes the page information acquiring processing (Step S303). At this time, the control unit 11 specifies the "X"th link information from the link information indicating the effective page informations, of the link informations included in the page information as currently viewed. In the page information acquiring processing, the child page information indicated by the link information as specified is acquired from a file and then stored in the RAM.

Then, the control unit 11 judges as whether or not the hint information is included in the child page information as acquired (Step S304). In case where the hint information is included in the child page information as acquired (YES in Step S304), the control unit 11, which serves as the synthesizing unit, synthesizes the hint information (Step S305). More specifically, the control unit 11 calculates a logical sum of the Bloom filter of the hint information for work and the Bloom filter of the hint information included in the child page information. The calculation of the logical sum is carried out for the respective blocks. Then, the control unit 11 sets the data of the logical sum as calculated, as the hint information of work.

In case where the hint information is not included in the child page information as acquired in Step S304 (NO in Step S304), or after completion of the processing of Step S305, the control unit 11 judges whether or not the record is included in the child page information as acquired (Step S318).

At this time, in case where the record is included in the child page information as acquired (YES in Step S318), the control unit 11 sets the record number "Y" as "1" Step S306). Then, the control unit 11 reflects the key included in the "Y"th key in the hint information for work (Step S307). More specifically, the control unit 11 calculates the hashed value of the key included in the "Y"th key. Then, the control unit 11 selects the block corresponding to the hashed value in the hint information for work. Then, the control unit 11 sets as "1" the element in a position corresponding to the hashed value in the block as selected.

After reflection of the key, the control unit 11 add "1" to the record number "Y" (Step S308). Then, the control unit 11 judges whether or not the record number "Y" is larger than the total number of the records included in the child page information as acquired (Step S309). The total number of the records may be obtained by counting the number of records included in the child page information as acquired. At this time, in case where the record number "Y" is equal to or less than the total number of the records included in the child page information as acquired (NO in Step S309), the control unit 11 causes the system to move to Step S307.

In case where the record is included in the child page information as acquired (NO in Step S318), or the record number "Y" is larger than the total number of the records included in the child page information as acquired (YES in Step S309), the control unit 11 adds "1" to the link number "X" (Step S310). Then, the control unit 11 judges whether or not the link number "X" is larger than the total number of link informations indicating the effective page information, of the link information included in the page information as currently viewed (Step S311). The total number of link informations indicating the effective page information may be obtained by counting the total number of link informations indicating the effective page information, of the link information included in the page information as currently viewed. In case where the page number included in the link information is set for example as an invalid value, this link information does not indicate any effective page information. In case where the page number is set so as to start from "1", the link information in which the page number is set as a value, which is equal to or larger than "1", is effective, but the link information in which the page number is set as "0", is invalid. At this time, in case where the link number "X" is equal to or less than the total number of the link informations indicating the effective page information, of the link informations included in the page information as currently viewed (NO in Step S311), the control unit 11 causes the system to move to Step S303.

In case where the link number "X" is larger than the total number of the link informations indicating the effective page information, of the link informations included in the page information as currently viewed (YES in Step S311), the control unit 11 compresses the respective blocks stored in the block storage region of the hint information for work (Step S312). Then, the control unit 11 judges whether or not the data size of the hint information for work after compression is equal to or less than the upper limit size (Step S313). At this time, in case where the data size of the hint information for work after compression is larger than the upper limit size (NO in Step S313), the control unit 11 determines the limited size of the block (Step S314). Then, the control unit 11 collapses the respective block included in the hint information for work so that the block size coincides with the limited size (Step S315). Then, the control unit 11 compresses the respective block as collapsed (Step S316).

In case where the data size of the hint information for work after compression is equal to or less than the upper limit size in Step S313, or after completion of the processing of Step S316, the control unit 11 causes the respective blocks as compressed to be included in the hint information for work. Then, the control unit 11 causes this hint information for work to be included in the hint information storage region of the page information as currently viewed (Step S317). After completion of this processing, the control unit 11 quits the hint information creating processing.

Now, there will be given below supplementary description of differences in the hint information creating processing between the case where the range of numerical values is applied and the case where the Bloom filter is applied. In this case, the control unit 11 causes the range of numerical values as indicated by the hint information for work and the range of numerical values as indicated by the child page information to be synthesized in Step S305. The control unit 11 sets the range of numerical values as synthesized, as the hint information for work.

In case where the value of the key is within the range of numerical values as indicated by the hint information for work, the hint information is not modified. In case where the value of the key is larger than the range of numerical values as indicated by the hint information for work, the control unit 11 sets the hint information for work, in which the value of the key is used as the new upper limit value of the range of numerical values. In this case, the lower limit value of the range of the numerical values is not changed. In case where the value of the key is equal to or less than the range of numerical values as indicated by the hint information for work, the control unit 11 sets the hint information for work, in which the value of the key is used as the new lower limit value of numerical values. In this case, the upper limit value of the range of the numerical values is not changed.

The compressing and the collapsing of the block in Steps S312 to S316 are not carried out.

The control unit 11 acquires the current root link information from the RAM as shown in FIG. 13(a) (Step S351). Then, the control unit 11 executes the page information acquiring processing (Step S352). At this time, the control unit 11 specifies the root link information. In the page information acquiring processing, the root page information indicated by the root link information as specified is acquired from a file and then stored in the RAM.

Then, the control unit 11, which serves as the retrieval unit, executes a sub-tree retrieval processing (Step S353). At this time, the control unit 11 specifies the root page information as acquired and the retrieval key as inputted. In the sub-tree retrieval processing, the page information as specified is subjected to a retrieval of record and a judgment utilizing the hint information. A recursive call can be made in the sub-tree retrieval processing. The retrieval of record is made utilizing the retrieval key as inputted, while tracing a path on the page information to be retrieved from the root page information to the leaf page information in accordance with the recursive call of the sub-tree retrieval processing. Detailed description of the sub-tree retrieval processing will be given later.

Then, the control unit 11 causes the retrieval results in the sub-tree retrieval processing to be displayed on the display unit 14 (Step S354). After completion of this processing, the control unit 11 quits the record retrieval processing.

Figure 13:
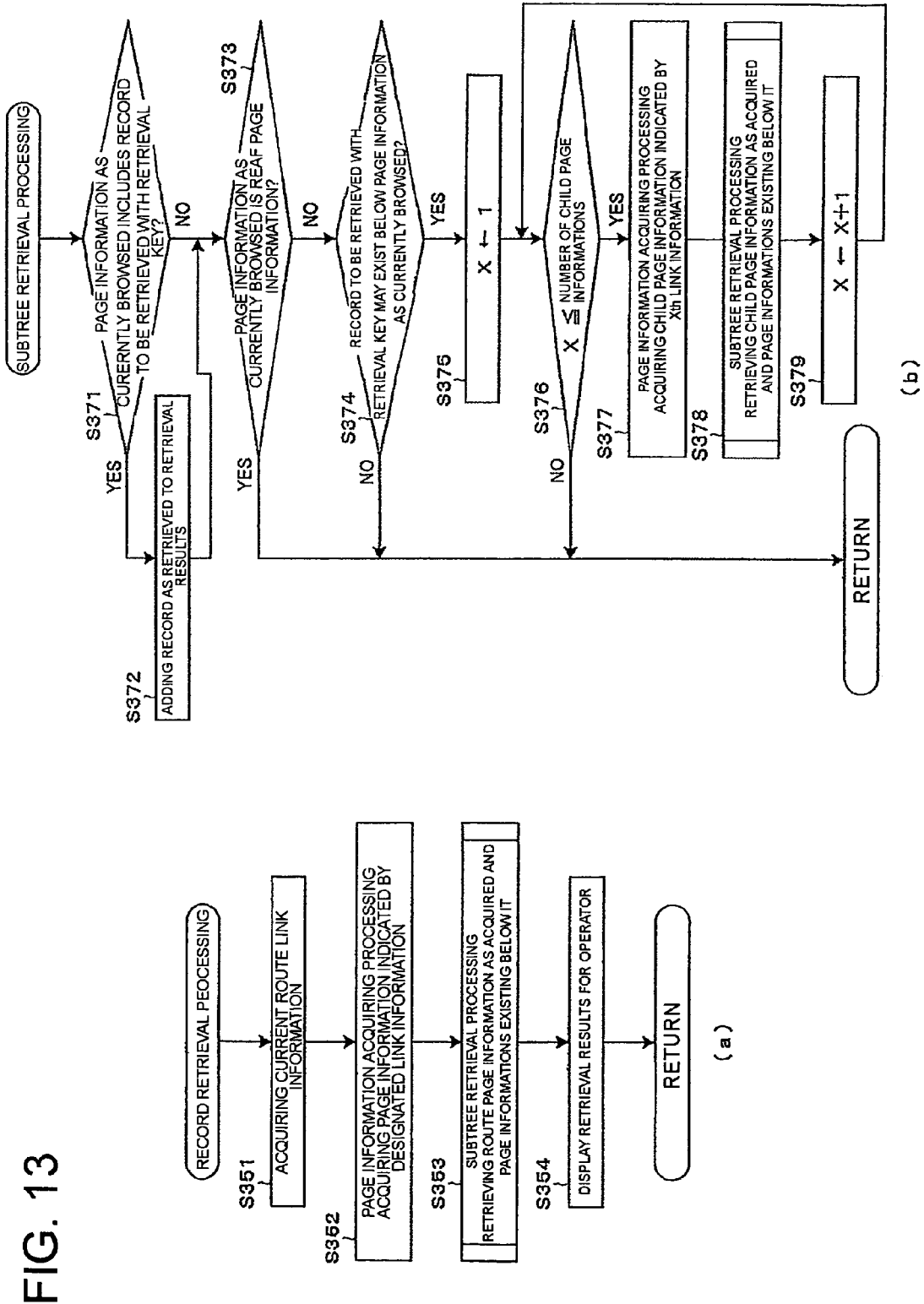
FIG. 13(a) is a flowchart showing an example of processing in a record retrieval processing of the control unit 11 in the central server "SA" according to the embodiment of the present invention.
FIG. 13(b) is a flowchart showing an example of processing in a sub-tree retrieval processing of the control unit 11 in the central server "SA" according to the embodiment of the present invention.

The control unit 11 utilizes the page information as specified as the page information as currently viewed, as shown in FIG. 13(*b*). The control unit 11 judges whether or not the page information as currently viewed includes the record to be retrieved with the retrieval key (Step S371). The page information as currently viewed includes no records, and this means that there is no record to be retrieved with the retrieval key. In case where the page information as currently viewed includes the record, the control unit 11 causes the retrieval key as inputted and the key included in the respective record to be compared to each other. On the basis of such a comparison, the record in which the included key coincides with the retrieval key, for example, becomes the record to be retrieved with the retrieval key. In case where the page information as currently viewed includes the record to be retrieved with the retrieval key (YES in Step S371), the control unit 11 causes the record as retrieved to be added to the retrieval results (Step S372). More specifically, the control unit 11 additionally sets the record to be retrieved in the predetermined region of the RAM.

In case where the page as currently viewed does not include the record to be retrieved with the retrieval key (NO in Step S371) or after completion of the processing of Step S372, the control unit 11 judges whether or not the page information as currently viewed is the leaf page information (Step S373). At this time, in case where the page information as currently viewed is the leaf page information (YES in Step S373), the child page information does not exist in the page information as currently viewed, and the control unit 11 quits the sub-tree retrieval processing.

In case where the page information as currently viewed is the leaf page information (NO in Step S373), on the other hand, the control unit 11, which serves as the judgment unit, judges, based on the retrieval key and the hint information included in the page information as currently viewed, whether or not there is a "possible retrieval". More specifically, the control unit 11 judges a possibility that the record to be retrieved with the retrieval key exists in the page information, which is located in a position of child of the page information as currently viewed, and in lower positions than the above-mentioned position (Step S374). In particular, the control unit 11 calculates the hashed value of the retrieval key. Then, the control unit 11 specifies, based on the hashed value, the block in which the element corresponding to the hashed value is set in the hint information. Then, the control unit 11 makes a copy of the block as specified of the hint information and saves it in the predetermined region of the RAM. Then, the control unit 11 decompresses the copied block. When the block has been collapsed, the control unit 11 expands this block. Then, the control unit 11 acquires the element corresponding to the hashed value from the block as decompressed or expanded. The acquired element as being set as "1" leads to a judgment of "possible retrieval", and the acquired element as being set as "0" leads to a judgment of "no-possible retrieval".

In case of a judgment of "no-possible retrieval" (NO in Step S374), the control unit 11 excludes from an object to be retrieved the page information, which is associated with the information from the page information, which is located in a position of child of the page information as currently viewed, to the leaf page information. More specifically, the control unit 11 quits the sub-tree retrieval processing. Accordingly, there is no need to retrieve the page information, which is associated with the information from the child page information to the leaf page information, thus making it possible to achieve an effective retrieval of record. In addition, when the plurality of page informations are decentrally stored by the plurality of nodes "Nn", there is no need to communicate the page information deleted from an object to be retrieved, between the nodes "Nn", thus permitting to reduce a network load. In case of a judgment of "possible retrieval" (YES in Step S374), on the other hand, the control unit 11 sets the link number "X" as "1" (Step S375).

Then, the control unit 11 judges whether or not the link number "X" is equal to or less than the total number of the link informations indicating the effective page information, of the link informations included in the page information as currently viewed (Step S376). The total number of the link informations indicating the effective page information may be obtained by counting the number of the link informations indicating the effective page information, of the link informations included in the page information as currently viewed.

In case where the link number "X" is equal to or less than the total number of the link informations indicating the effective page information, of the link informations included in the page information as currently viewed (YES in Step S376), the control unit 11 executes the page information acquiring processing (Step S377). At this time, the control unit 11 specifies the "X"th link information, of the link informations indicating the effective page information, of the link informations included in the page information as currently viewed. In the page information acquiring processing, the child page information indicated by the link information as specified is acquired from a file and then stored in the RAM.

Then, the control unit 11 makes a recursive call for the sub-tree retrieval processing (Step S387). At this time, the control unit 11 specifies the page information as acquired and the retrieval key as inputted. The, the control unit 11 adds "1" to the link number "X" (Step S379) and causes the system to move to Step S376.

In case where the link number "X" is larger than the total number of the link informations indicating the effective page information, of the link informations included in the page information as currently viewed in Step S376 (NO in Step S376), the control unit 11 quits the sub-tree retrieval processing.

There are two steps to which the system may move after the completion of the sub-tree retrieval processing. In case where a recursive call for the sub-tree retrieval processing causes the current sub-tree retrieval processing to be executed, the system moves to Step S379 of the sub-tree retrieval processing for a invoker. In case where a call from the record retrieval processing causes the current sub-tree retrieval processing to be executed, the system moves to Step S354 of the record retrieval processing.

Now, there will be given below supplementary description of differences in the hint information creating processing between the case where the range of numerical values is applied to the hint information and the case where the Bloom filter is applied to it. In this case, the control unit 11 causes the retrieval key and the range of numerical values to be compared to each other in Step S374. As a result of comparison, the retrieval key is included in the range of numerical value indicated by the hint information, thus leading to a judgment of "possible retrieval". On the other hand, the retrieval key is not included in the range of numerical value indicated by the hint information, thus leading to a judgment of "no-possible retrieval".

[6.2 Operation of Node "Nn"]

Figure 14:
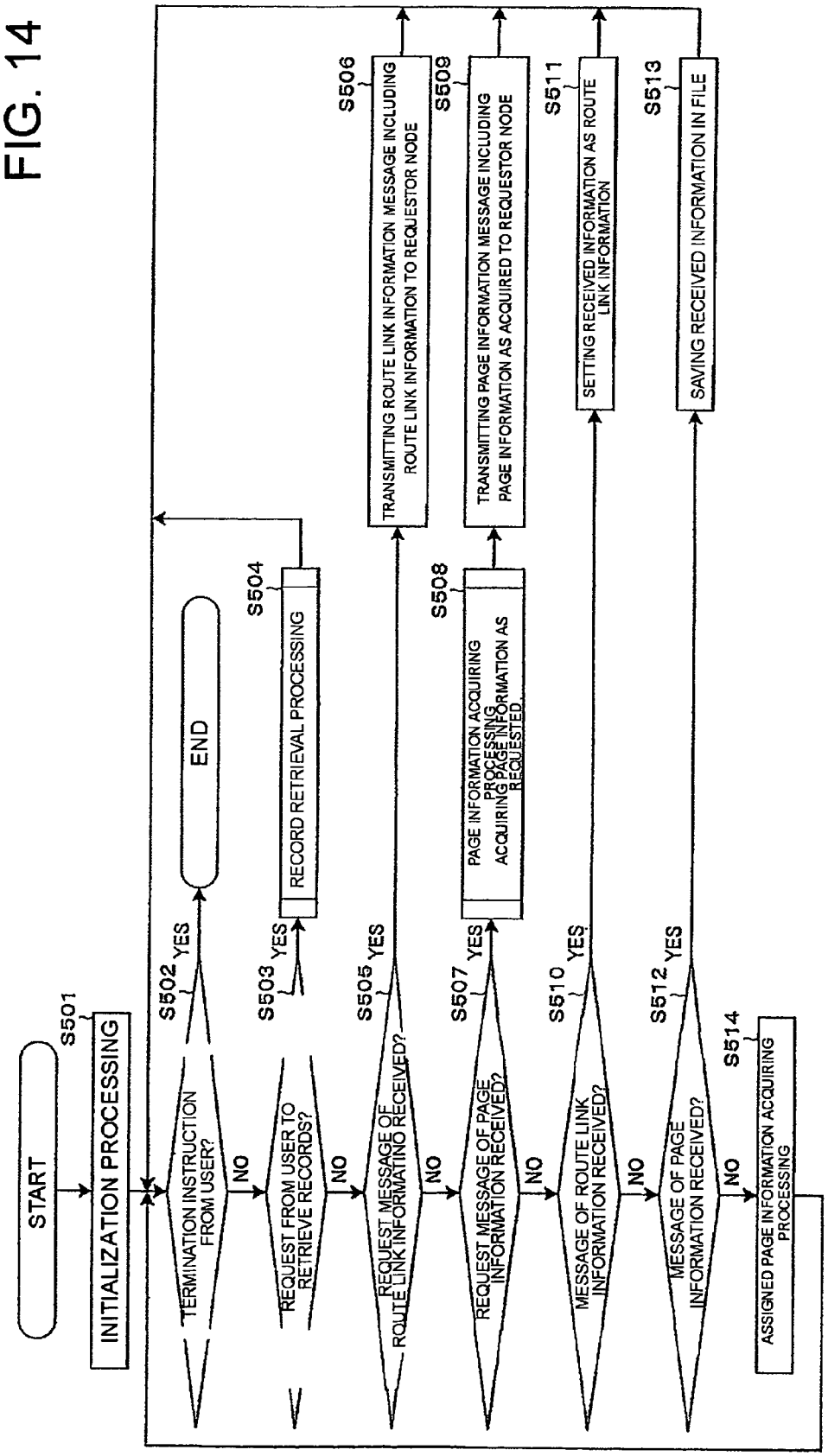
FIG. 14 is a flowchart showing an example of processing of the control unit 21 in the node "Nn" according to the embodiment of the present invention.

The processing as shown in FIG. 14 starts when for example a node "Nn" participates in the content decentrally saving system "S". First, a control unit 21 executes an initialization processing (Step S501). In this initialization processing, the sending of a request message of root link information causes the root link information to be acquired from the other node "Nn" of the central server "SA".

Then, the control unit 21 judges based on the input from an input unit 30 whether or not a termination instruction from a user has been given (Step S502).

In case where no termination instruction has not been given in Step S502 (NO in Step S502), the control unit 21 judges based on the input from the input unit whether or not a request from a user to retrieve a record has been made (Step S503). In case where the request to retrieve a record has been made (YES in Step S503), the control unit 21 executes the record retrieval processing (Step S504). At this time, the control unit 21 specifies the retrieval key as inputted from the input unit 30 through an operation of the user. In the record retrieval processing, a record is retrieved from the catalog information with the retrieval key as specified. The contents of the record retrieval processing and the tree retrieval processing are the same as those of the record retrieval processing and the tree retrieval processing as carried out in the central server "SA". Therefore, detailed description of them are omitted. However, the page information acquiring processing, which follows the record retrieval processing and the tree retrieval processing, is different in contents from the page information acquiring processing as carried out in the central server "SA". Detailed description of this page information acquiring processing will be given later.

In case where the request to retrieve a record has not been made (NO in Step S503) in Step S503, the control unit 21 judges whether or not the request message of root link information has been received (Step S505). At this time, in case where the request message of root link information has been received (YES in Step S505), the control unit 21 sends the root link information, which is stored in the RAM, as included in the root link information message to a node "Nn" as a requester (Step S506).

In case where the request message of root link information has not been received in Step S505 (NO in Step S505), the control unit 21 judges whether or not the request message of page information has been received (Step S507). At this time, in case where the request message of page information has been received, the control unit 21 executes the page information acquiring processing (Step S508). At this time, the control unit 21 specifies the link information and index included in the request message of page information and saves them in the RAM. When there is no file, which saves the page information indicated by the link information as specified, this page information is acquired from the central server "SA" or the other noted "Nn". Detailed description of the page information acquiring processing will be given later. The control unit 21, which acquired the page information as requested, sends this page information included in the page information message to the node "Nn" as a requester (Step S509).

In case where the request message of page information has not been received in Step S507 (NO in Step S507), the control unit 21 judges whether or not the root link information message has been received (Step S510). At this time, in case where the root link information message has been received (YES in Step S510), the control unit 21 sets the information included in the root link information message, as the root link information in the RAM (Step S511).

In case where the root link information message has not been received in Step S510 (NO in Step S510), the control unit 21 judges whether or not the page information message has been received (Step S512). At this time, in case where the page information message has been received (YES in Step S512), the control unit 21 saves the information included in the page information message, as the page information in a file (Step S513).

In case where the page information message has not been received in Step S512 (NO in Step S512), the control unit 21 executes an assigned page information acquiring processing (Step S514). In this assigned page information acquiring processing, the page information included in an assigned range of the node "Nn" is acquired from the server "SA" or the other node "Nn" and then stored in a storage unit 22.

After completion of the processing of Steps S504, S506, S509, S511, S513 or S514, the control unit 21 causes the system to move to Step S502. In case where a termination instruction from an operator has been given in Step S502 (YES in Step S502), the control unit 11 quits the processing.

Figure 15:
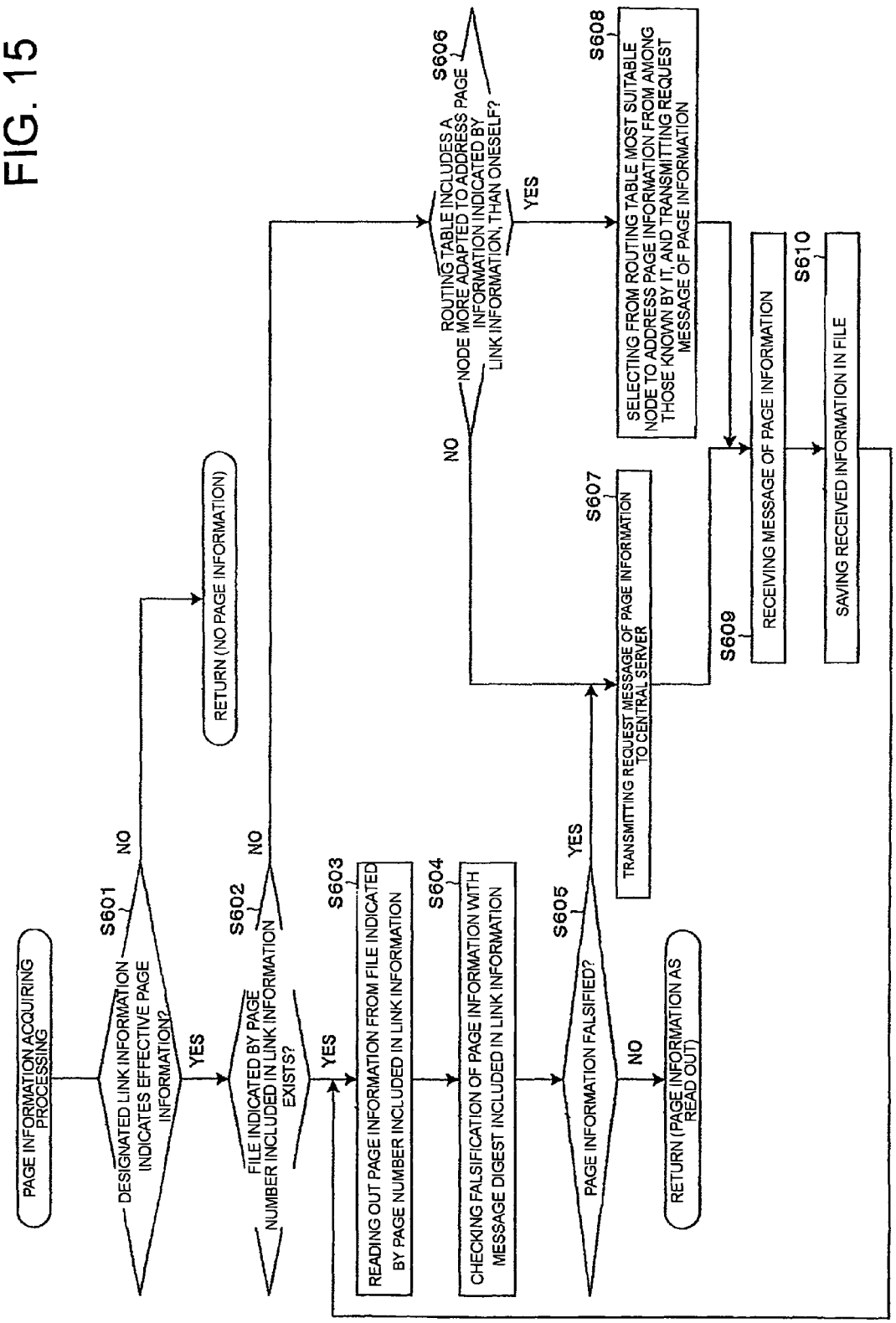
FIG. 15 is a flowchart showing an example of processing in a page information acquiring processing of the control unit 21 in the node "Nn" according to the embodiment of the present invention.

The control unit 21 judges whether or not the information as specified indicate an effective page information as shown in FIG. 15 (Step S601). When the page number of the link information is set as an invalid value for example, this link information does not indicate an effective page information. At this time, in case where the link information as specified does not indicate an effective page information (NO in Step S601), the control unit 21 quits the page information acquiring processing. In this case, the information having no page information is returned to the processing of an invoker.

In case where the link information as specified indicates an effective page information (YES in Step S601), the control unit 21 judges whether or not the file indicated by the page number included in this link information is stored in the storage unit 22 (Step S602). In case where the file indicated by the page number included in the link information as specified is stored (YES in Step S602), the control unit 21 reads out the page information from the file indicted by the page number included in the above-mentioned link information and then store it in the RAM (Step S603).

Then, the control unit 21 utilizes the message digest included in the link information as specified to check falsification of the page information as read out (Step S604). More specifically, the control unit 21 calculates the message digest of the page information as read out. The same hashed function used for calculating the message digest in the page information registration processing is used in calculation of the above-mentioned message digest. The control unit 21 judges whether or not the message digest as calculated coincides with the message digest included in the link information as specified. Coincidence leads to a judgment that the root link information has not been falsified, on the one hand, and non-coincidence leads to a judgment that the root link information has been falsified.

Then, the control unit 21 judges whether or not the root page information as read out has been falsified (Step S605). In case where the page information has not been falsified (NO in Step S605), the control unit 21 causes the page information as read out to be returned to the previous processing and the page information acquiring processing to quit. It is therefore possible to prevent a record from being retrieved with the page information as falsified.

In case where a file indicated by the page number included in the link information as specified has not been stored in Step S602 (NO in Step S602), the control unit 21 judges whether or not there exists a more appropriate node "Nn" than the control unit 21's own node for assigning the page information indicated by the link information (Step S606). A judgment as whether or not there exists the more appropriate node "Nn" for assigning the page information indicated by the link information is made within the range of the nodes "Nn" whose node informations are registered in the routing table. The more appropriate node "Nn" than the control unit 21's own node for assigning the page information is for example a node "Nn", which has a larger number of coincident upper digits with the index as specified, than the node ID of the control unit 21's own node.

In case where there does not exist a more appropriate node "Nn" than the control unit 21's own node for assigning the page information indicated by the link information (NO in Step S606), or the page information has been falsified in Step S605 (YES in Step S605), the control unit 21 sends the request message of page information to the central server "SA" (Step S607). At this time, the control unit 21 sets the link information and the index, as specified, in the request message of page information.

In case where there exists a more appropriate node "Nn" than the control unit 21's own node for assigning the page information indicated by the link information (YES in Step S606), on the other hand, the control unit 21 acquires the page information indicated by the link information from the other node "Nn". More specifically, the control unit 21 sends the request message of page information to the most appropriate node "Nn" for assigning the page information indicated by the link information (Step S608). The most appropriate node "Nn" for assigning the page information indicated by the link information is for example a node "Nn", which has the largest number of coincident upper digits with the index as specified.

The control unit 21, which has sent the request message of page information in Step S607 or S608, receives the page information message, which has been sent from the central server "SA" or the other node "Nn" in response to the request message of page information as sent (Step S609). Then, the control unit 21 saves the information included in the page information message as received in a file in the form of the page information (Step S610). After completion of this processing, the control unit 21 causes the system to move to Step S603. At this time, the control unit 21 reads out the page information again and checks falsification of the page information as read out (Steps S603 and S604). In case where the page information has not been falsified in Step S605 (NO in Step S605), the control unit 21 causes the page information acquiring processing to quit.

In case where the page information as acquired from the other node "Nn" has been falsified in Steps S608 to S610, the page information is acquired from the central server "SA" in Step S607. It is therefore possible to prevent a record from being retrieved with the page information as falsified, in the record retrieval processing and the tree retrieval processing. In case where it is judged that the page information has been falsified in the record retrieval processing or the tree retrieval processing, the retrieval of a record may be halted.

The retrieval key to be inputted when conducting a retrieval operation has been described as a single retrieval key in the embodiment of the present invention. However, a retrieval with the use of a plurality of keys, i.e., a so called "OR Retrieval", "AND Retrieval", etc. may be conducted. Such a retrieval operation may be conducted for example in the following manner. A judgment of "possible retrieval" or "no-possible retrieval" utilizing the hint information is made with the respective keys. In the "OR Retrieval", when one judgment of "possible retrieval" has been made, the inclusion of, as an object to be retrieved, the page information, which is located in a position of child of the page information to be currently retrieved, suffices. In the "AND Retrieval", only when all the judgment results are of "possible retrieval", the inclusion of, as an object to be retrieved, the page information, which is located in a position of child of the page information to be currently retrieved, suffices.

In the embodiment of the present invention, the information creating apparatus according to the present invention has been described as being applied to the server apparatus having the peer-to-peer system. However, it may be applied for example to a server apparatus in a client-server system.

The present invention may not be limited only to the retrieval of the content catalog information. It is applicable to a record of versatile database.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. An information creating apparatus comprising a hardware controller programmed with:

a page information storing unit that stores a plurality of page informations in a tree structure, wherein each page information is associated with information from root page information located in roots to leaf page information located in leaves;

a leaf page information creating unit that creates said leaf page information comprising one or more records having a key information for comparison with a retrieval key information inputted for retrieval of a record;

a node page information creating unit that creates one or more node page informations, wherein each node page information includes a judgment information and a link information; and wherein the node page information creating unit is further configured to create said judgment information based on said key information, wherein said judgment information includes information indicating a possibility that the leaf page information in the child position relative to the node page information includes said record to be retrieved; and wherein the node page information creating unit is further configured to create said link information, wherein said link information is separate from the judgment information and indicates the association between the node page information and other page informations; and a root page information creating unit that creates said root page information, which includes a judgment information and a link information, said judgment information associated with the node page information located in the child positions of said root page information;

wherein said page information storing unit stores said root page information, said node page information and said leaf page information in said tree structure.

2. The information creating apparatus as claimed in claim 1, wherein:

said node page information creating unit and said root page information creating unit have a synthesis section, that synthesizes, when a plurality of the node page information is associated with the child positions of said page information as created, said judgment information being included in said plurality of the node page information to create a new judgment information; and said node page information creating unit and said root page information creating unit create page information including said new judgment information as created by said synthesis section.

3. The information creating apparatus as claimed in claim 2, wherein:
said judgment information has an array structure in which hash values are used as an index and respective elements of the array include at least existence or non-existence of said key information;
said node page information creating unit calculates the hash values of said key information of said record included in said leaf page information, which is located in the child position of the node page information and in lower positions than said position, and creates the judgment information in which the elements of the array corresponding to the hash values are indicative of existence of said key information; and
said synthesis section calculates a logical sum of respective elements of the array included in the plurality of node page information, which are located in the child position of said page information as created, to create said new judgment information.

4. The information creating apparatus as claimed in claim 3, wherein:
said node page information creating unit and said root page information creating unit compress said judgment information to create a compressed judgment information, create said page information, which includes said compressed judgment information as said judgment information, calculate, in case where an amount of information of said compressed judgment information exceeds a predetermined amount, a logical sum of respective elements of an array of a plurality of divided judgment informations into which said judgment information is divided, to create divided synthesized judgment informations, and compress said divided synthesized judgment informations to create said compressed judgment information.

5. The information creating apparatus as claimed in claim 2, wherein:
said key information comprises numerical value information or information having an attribute, which may be expressed with the numerical value information,
said node page information creating unit creates the judgment information, which is indicative of a range between a numerical value information having a minimum value set as a lower limit and a numerical value information having a maximum value set as an upper limit, said lower limit and said upper limit being determined from the numerical value information indicative of any one of said key information or the attribute of said key information of said record included in said leaf page information, which is located in the child position of the node page information and in lower positions than the child position;
said synthesis section creates a new judgment information in which a minimum lower limit is set as a new lower limit from the lower limits of the judgment informations included in the plurality of node page informations, and a maximum upper limit is set as a new upper limit from the upper limits of the judgment informations included in the plurality of node page informations, said plurality of node page informations being located in the child positions of said page information created by said node page information creating unit or said root page information creating unit.

6. The information creating apparatus as claimed in claim 1, further comprising:
a retrieval input unit through which said retrieval key information is inputted; and
a retrieval unit that utilizes said retrieval key information to retrieve said record information, while tracing a path from said root page information to said leaf page information having said record to be retrieved, and
wherein said retrieval unit has a judgment unit that judges a possibility of existence of said record to be retrieved from a page information based on said judgment information included in that page information and said retrieval key information, and
wherein said retrieval unit excludes from said retrieval page informations in the child position for which said judgment unit has judged there to be no possibility of existence of said record to be retrieved.

7. A recording medium in which there is recorded an information creating program for creating a plurality of page informations in a tree structure, which are associated with information from root page information located in roots to leaf page information located in leaves, said program configured to be executed by a computer to carry out the following steps of:
creating at least one leaf page information comprising one or more records having a key information for comparison with a retrieval key information inputted;
creating, based on said key information of said record in said leaf page information, a judgment information for judging a possibility that said leaf page information includes said record to be retrieved with said retrieval key information, and creating at least one node page information in the parent position to said leaf page information, that includes said judgment information and a link information, wherein said link information is separate from the judgment information and indicates the association between the node page information and other page informations;
creating root page information, which includes said judgment information included in said node page information located in the child positions of said root page information; and
storing said root page information, said node page information and said leaf page information in said tree structure.

8. An information creating method for creating a plurality of page informations in a tree structure so as to be associated with information from root page information located in roots to leaf page information located in leaves, comprising the steps of:
creating at least one leaf page information comprising one or more records having a key information for comparison with a retrieval key information inputted for retrieval of a record;
creating, based on said key information of said record a judgment information for judging a possibility that said leaf page information includes said record to be retrieved with said retrieval key information, and creating at least one node page information in the parent position to said leaf page information, that includes said judgment information and a link information, wherein said link information is separate from the judgment information and indicates the association between the node page information and other page informations; and creating root page information, which includes said judgment information included in said node page information in the child position relative to said root page information; and storing said root page information, said node page information and said leaf page information in a tree structure.

9. A node apparatus comprising a hardware controller programmed with:

a retrieval input unit through which a retrieval key information used for retrieval of a record is inputted;

a page information storing unit that stores a plurality of page informations in a tree structure, wherein information from a root page information is associated with information from leaf page information; wherein said page information storing unit is configured to store said leaf page information comprising one or more records having a key information, wherein said key information is for comparison with said retrieval key information; wherein said page information storing unit is configured to store node page information, wherein said node page information includes a judgment information and a link information; wherein said judgment information is created based on said key information of said record included in said leaf page information and includes information indicating a possibility that the leaf page information in the child position relative to the node page information includes said record to be retrieved; wherein said link information is separate from the judgment information and indicates the association between the node page information and other page informations; and a retrieval unit that utilizes said retrieval key information to retrieve said record information, while tracing a path from said root page information to a leaf page information having said record information, and wherein said retrieval unit has a judgment unit that judges the possibility of existence of said record to be retrieved at a leaf page information; wherein said possibility of existence is based on judgment information in a leaf page information and said retrieval key information; wherein said judgment unit is further configured to instruct said retrieval unit to exclude from said path any page information having no possibility of existence of said record to be retrieved.

10. The node apparatus as claimed in claim 9, further comprising:

a page information acquiring unit that acquires, in case where said page information to be retrieved is not stored in said page information storing unit, at least one page information from another node apparatus through a network; and wherein:

said retrieval unit retrieves information based on the page information stored in said page information storing unit and page information acquired by said page information acquiring unit.

11. The node apparatus as claimed in claim 10, wherein said root page information and said node page information further comprise a falsification checking information for checking falsification of child page information;

and wherein said node apparatus further comprises a falsification judgment unit that judges whether or not said page information acquired by said page information acquiring unit is falsified, based on said falsification checking information included in the parent page information; and wherein said judgment unit judges, when said acquired page information has been judged by said falsification judgment unit as not being falsified, a possibility of existence of said record to be retrieved at said acquired page information.

12. A recording medium in which there is recorded a node program for retrieving a record using a plurality of page informations in a tree structure, which are associated with information from root page information located in roots to leaf page information located in leaves, said program to be executed by a computer to carry out the following step of:

retrieving record information with a use of a retrieval key information as inputted, while tracing a path on said page information to be retrieved from said root page information to said leaf page information, said root page information and said leaf page information being stored in a page information storing unit, which stores:

said leaf page information including one or more records having a key information for comparison with said retrieval key information;

node page information including a judgment information created, based on a key information of said record included in said leaf page information, in order to judge a possibility that said leaf page information includes said record to be retrieved, said leaf page information being located in a child position of the node page information located between said root page information and said leaf page information, and in lower positions than said child position, wherein said node page information further includes a link information, wherein said link information is separate from the judgment information and indicates the association between the node page information and other page informations; and said root page information including said judgment information included in said node page information located in the child positions of said root page information; and wherein:

in case where, in said retrieving, said page information to be retrieved is said root page information or said node page information, a second judgment is executed judging a possibility of existence of said record to be retrieved, based on said judgment information included in said page information and said retrieval key information; and in case where, in said second judgment, it is judged that there is no possibility of existence of said record to be retrieved, said retrieving is executed so that the page information, which is associated with the information from child page information at the child positions of said page information to be retrieved to said leaf page information is excluded from an object to be retrieved.

13. A retrieval method for retrieving a record, with a use of a plurality of page informations in a tree structure, which are associated with information from root page information located in roots to leaf page information located in leaves, said method comprising:

retrieving record information with a use of a retrieval key information as inputted, while tracing a path from a root page information to a leaf page information having said record, said root page information and said leaf page information being stored in a page information storing unit, which stores:

said leaf page information including one or more records having a key information for comparison with the retrieval key information;

node page information including a judgment information created, based on a key information of said record included in said leaf page information, for judging a possibility that said leaf page information includes said record to be retrieved, said leaf page information being located in a child position of the node page information located between said root page information and said leaf page information, and in lower positions than said position, wherein said node page information further includes a link information, wherein said link information is separate from the judgment information and indicates the association between the node page information and other page informations; and said root page information including said judgment information included in said node page information located in the child positions of said root page information; and wherein said retrieving comprises, when said page information to be retrieved said root page information or said node page information, a second judgment of judging a possibility of existence of said record to be retrieved, based on said judgment information included in said page information and said retrieval key information inputted; and said retrieving causes the page information to be excluded from an object to be retrieved, when, in said second judgment, it is judged that there is no possibility of existence of said record to be retrieved, said page information being associated with the information from child page information at the child positions of said page information to be retrieved to said leaf page information.

* * * * *